(12) United States Patent
Betancourt et al.

(10) Patent No.: US 9,792,632 B2
(45) Date of Patent: Oct. 17, 2017

(54) SYSTEM AND METHOD FOR PROCESSING VEHICLE TRANSACTIONS

(75) Inventors: Ernest Blas Betancourt, Lascassas, TN (US); Deborah Anne Betancourt, Arrington, TN (US); Kokesh P. Kadakia, Goodlettsville, TN (US)

(73) Assignee: Epona LLC, Franklin, TN (US)

( * ) Notice: Subject to any disclaimer, the term of this patent is extended or adjusted under 35 U.S.C. 154(b) by 55 days.

(21) Appl. No.: 12/573,604

(22) Filed: Oct. 5, 2009

(65) Prior Publication Data

US 2010/0088127 A1    Apr. 8, 2010

Related U.S. Application Data

(63) Continuation-in-part of application No. 11/678,110, filed on Feb. 23, 2007.

(51) Int. Cl.
| | |
|---|---|
| G06Q 30/00 | (2012.01) |
| G06Q 30/06 | (2012.01) |
| G06Q 10/02 | (2012.01) |
| G06Q 10/06 | (2012.01) |

(52) U.S. Cl.
CPC ......... G06Q 30/0601 (2013.01); G06Q 10/02 (2013.01); G06Q 10/06 (2013.01)

(58) Field of Classification Search
CPC .... G06Q 10/06; G06Q 10/02; G06Q 30/0601; G06Q 20/206; G06Q 20/382
USPC ........ 705/26.1; 235/379, 380, 382, 449, 381
See application file for complete search history.

(56) References Cited

U.S. PATENT DOCUMENTS

| | | |
|---|---|---|
| 4,250,550 A | 2/1981 | Fleischer |
| 4,490,798 A | 12/1984 | Franks et al. |
| 4,658,371 A | 4/1987 | Walsh et al. |
| 4,804,937 A | 2/1989 | Barbiaux et al. |
| 5,400,018 A | 3/1995 | Scholl et al. |
| 5,694,322 A | 12/1997 | Westerlage et al. |
| 5,700,999 A | 12/1997 | Streicher et al. |
| 5,724,243 A | 3/1998 | Westerlage et al. |

(Continued)

FOREIGN PATENT DOCUMENTS

| | | |
|---|---|---|
| EP | 1024463 A2 | 8/2000 |
| WO | 95/21506 A2 | 8/1995 |

OTHER PUBLICATIONS

U.S. Non-Final Office Action for related U.S. Appl. No. 11/678,125 dated Mar. 2, 2011.

(Continued)

*Primary Examiner* — Yogesh C Garg
(74) *Attorney, Agent, or Firm* — Banner & Witcoff, Ltd.

(57) ABSTRACT

A method and system for processing a transaction request prior to a vehicle arriving at a service station is provided. Upon entering a wireless service area of a back office system associated with a service station, a driver and/or truck may request certain transactions. The back office system may communicate with a carrier information system associated with the driver and/or truck to validate and authorize the transaction. If the transaction is authorized, the back office system may send authorization to the service station. Once the driver and/or truck arrives at the point of sale, they may proceed directly to performing the requested transaction. A receipt may be automatically generated at the point of sale and transmitted to the carrier information system through the back office.

35 Claims, 18 Drawing Sheets

(56) References Cited

U.S. PATENT DOCUMENTS

| | | | |
|---|---|---|---|
| 5,819,234 A | 10/1998 | Slavin et al. | |
| 5,862,222 A | 1/1999 | Gunnersson | |
| 5,913,180 A | 6/1999 | Ryan | |
| 5,923,572 A | 7/1999 | Pollock | |
| 5,970,481 A | 10/1999 | Westerlage et al. | |
| 5,974,356 A | 10/1999 | Doyle et al. | |
| 5,987,377 A | 11/1999 | Westerlage et al. | |
| 6,045,040 A | 4/2000 | Streicher et al. | |
| 6,072,402 A | 6/2000 | Kniffin et al. | |
| 6,116,505 A | 9/2000 | Withrow | |
| 6,124,810 A | 9/2000 | Segal et al. | |
| 6,128,551 A | 10/2000 | Davis et al. | |
| 6,154,658 A | 11/2000 | Caci | |
| 6,195,019 B1 | 2/2001 | Nagura | |
| 6,213,393 B1 | 4/2001 | Streicher et al. | |
| 6,233,563 B1 | 5/2001 | Jefferson et al. | |
| 6,338,008 B1 | 1/2002 | Kohut et al. | |
| 6,343,241 B1 | 1/2002 | Kohut et al. | |
| 6,370,454 B1 | 4/2002 | Moore | |
| 6,389,337 B1 | 5/2002 | Kolls | |
| 6,402,030 B1 | 6/2002 | Summers et al. | |
| 6,441,732 B1 | 8/2002 | Laitsaari et al. | |
| 6,554,183 B1 | 4/2003 | Sticha et al. | |
| 6,574,603 B1 | 6/2003 | Dickson et al. | |
| 6,598,792 B1 | 7/2003 | Michot et al. | |
| 6,615,186 B1 | 9/2003 | Kolls | |
| 6,616,036 B2 | 9/2003 | Streicher et al. | |
| 6,738,697 B2 | 5/2004 | Breed | |
| 6,747,365 B2 | 6/2004 | Reinold et al. | |
| 6,856,820 B1 | 2/2005 | Kolls | |
| 6,895,310 B1 | 5/2005 | Kolls | |
| 6,899,151 B1 | 5/2005 | Latka et al. | |
| 6,965,872 B1 | 11/2005 | Grdina | |
| 6,991,160 B2 | 1/2006 | Demere | |
| 7,133,663 B2* | 11/2006 | Fano et al. | 455/414.1 |
| 7,379,920 B2 | 5/2008 | Leung et al. | |
| 7,478,069 B1* | 1/2009 | Ritter et al. | 705/52 |
| 7,481,366 B2 | 1/2009 | Demere | |
| 7,604,169 B2 | 10/2009 | Demere | |
| 7,668,644 B2* | 2/2010 | Tengler et al. | 701/123 |
| 7,729,998 B2 | 6/2010 | Dickman | |
| 2002/0020742 A1 | 2/2002 | Streicher et al. | |
| 2002/0065787 A1 | 5/2002 | Evers et al. | |
| 2002/0072963 A1 | 6/2002 | Jonge | |
| 2002/0160817 A1 | 10/2002 | Salmimaa et al. | |
| 2002/0186144 A1 | 12/2002 | Meunier | |
| 2003/0075287 A1* | 4/2003 | Weik, III | 160/133 |
| 2003/0083060 A1 | 5/2003 | Menendez | |
| 2003/0107548 A1 | 6/2003 | Eun et al. | |
| 2003/0120608 A1 | 6/2003 | Pereyra | |
| 2003/0167345 A1 | 9/2003 | Knight et al. | |
| 2003/0195676 A1 | 10/2003 | Kelly et al. | |
| 2004/0140354 A1 | 7/2004 | Demere | |
| 2004/0200897 A1 | 10/2004 | Demere | |
| 2004/0215575 A1* | 10/2004 | Garrity | G06Q 20/20 705/64 |
| 2004/0243285 A1 | 12/2004 | Gounder | |
| 2005/0017976 A1 | 1/2005 | Minakuchi et al. | |
| 2005/0035847 A1 | 2/2005 | Bonalle et al. | |
| 2005/0102074 A1 | 5/2005 | Kolls | |
| 2005/0125117 A1 | 6/2005 | Breed | |
| 2005/0177859 A1 | 8/2005 | Valentino, III et al. | |
| 2005/0184155 A1* | 8/2005 | Pinkus | 235/449 |
| 2005/0234616 A1 | 10/2005 | Oliver et al. | |
| 2005/0242950 A1 | 11/2005 | Lindsay et al. | |
| 2005/0248444 A1 | 11/2005 | Joao | |
| 2005/0273218 A1 | 12/2005 | Breed et al. | |
| 2005/0273385 A1* | 12/2005 | Vandervoort | G06Q 30/02 705/14.62 |
| 2006/0012479 A1 | 1/2006 | Ezra | |
| 2006/0018625 A1 | 1/2006 | Johnson et al. | |
| 2006/0022842 A1 | 2/2006 | Zoladek | |
| 2006/0048845 A1 | 3/2006 | Slavin et al. | |
| 2006/0052980 A1 | 3/2006 | LaFollette et al. | |
| 2006/0108413 A1 | 5/2006 | Demere | |
| 2006/0218056 A1 | 9/2006 | Dickman | |
| 2007/0050279 A1 | 3/2007 | Huang et al. | |
| 2007/0144605 A1* | 6/2007 | Horowitz | G06Q 50/30 141/83 |
| 2007/0273763 A1 | 11/2007 | Smith | |
| 2008/0040210 A1 | 2/2008 | Hedley | |
| 2008/0091544 A1* | 4/2008 | Linlor | 705/17 |
| 2008/0208701 A1 | 8/2008 | Betancourt et al. | |
| 2008/0214173 A1 | 9/2008 | Preiss et al. | |
| 2009/0208701 A1 | 8/2009 | Grose et al. | |
| 2010/0106641 A1 | 4/2010 | Chassin et al. | |
| 2010/0332363 A1 | 12/2010 | Duddle et al. | |
| 2013/0214904 A1* | 8/2013 | Ryan | 340/5.61 |

OTHER PUBLICATIONS

Office action for related U.S. Appl. No. 11/678,110 dated May 31, 2011.

Search Report and Written Opinion dated May 9, 2011, corresponding PCT Application No. PCT/US2011/026288.

U.S. Office Action dated Mar. 2, 2011, corresponding U.S. Appl. No. 11/678,125.

U.S. Office Action dated Dec. 21, 2011, corresponding U.S. Appl. No. 12/713,828.

Non-final office action for U.S. Appl. No. 11/678,110 dated Dec. 23, 2010.

Jan. 10, 2014 Final Office Action issued in U.S. Appl. No. 11/678,110.

Sep. 24, 2013 Office Action issued in U.S. Appl. No. 11/678,110.

"Driving In-Store Sales with Fuel", Lofstock, John, Convience Store Decisions, Aug. 2007, p. 12.

"A new wave of user applicatons fuels satellite renaissance", Greensteiin, Irwin, network Management, Dec. 1989, p. 22.

Office Action received in corresponding U.S. Appl. No. 11/678,110 dated Feb. 29, 2012.

Office Action received in corresponding U.S. Appl. No. 11/678,110 dated Jul. 3, 2012.

Office Action received in corresponding U.S. Appl. No. 11/678,125 dated Aug. 16, 2011.

Office Action received in corresponding U.S. Appl. No. 11/678,125 dated Sep. 30, 2010.

Office Action received in corresponding U.S. Appl. No. 11/678,125 dated Apr. 5, 2010.

Office Action received in corresponding U.S. Appl. No. 11/678,125 dated Sep. 3, 2009.

Office Action received in corresponding U.S. Appl. No. 11/678,125 dated Dec. 26, 2008.

Office Action received in corresponding U.S. Appl. No. 11/678,125 dated Jun. 27, 2008.

Notice of Allowance received in corresponding U.S. Appl. No. 12/713,828 dated Mar. 8, 2013.

Office Action received in corresponding U.S. Appl. No. 12/713,828 dated Jun. 13, 2012.

Jan. 10, 2014 Final Office Action issued in U.S. Appl. No. 11/768,110.

International Search Report & Written Opinion dated Feb. 21, 2012, for International Application No. PCT/US2011/051210 (14 pages total).

Office Action received in corresponding U.S. Appl. No. 11/678,110 dated Sep. 17, 2014.

Mar. 10, 2015—U.S. Final Office Action—U.S. Appl. No. 11/678,110.

Office Action in related Canadian application No. 2,621,531 dated Dec. 19, 2014.

Office Action received in corresponding U.S. Appl. No. 11/678,110 dated Nov. 9, 2015.

Jun. 6, 2016 U.S. Final Office Action—U.S. Appl. No. 11/678,110.

Feb. 15, 2017 (CA) Canadian Office Action—App No. 2,621,531.

\* cited by examiner

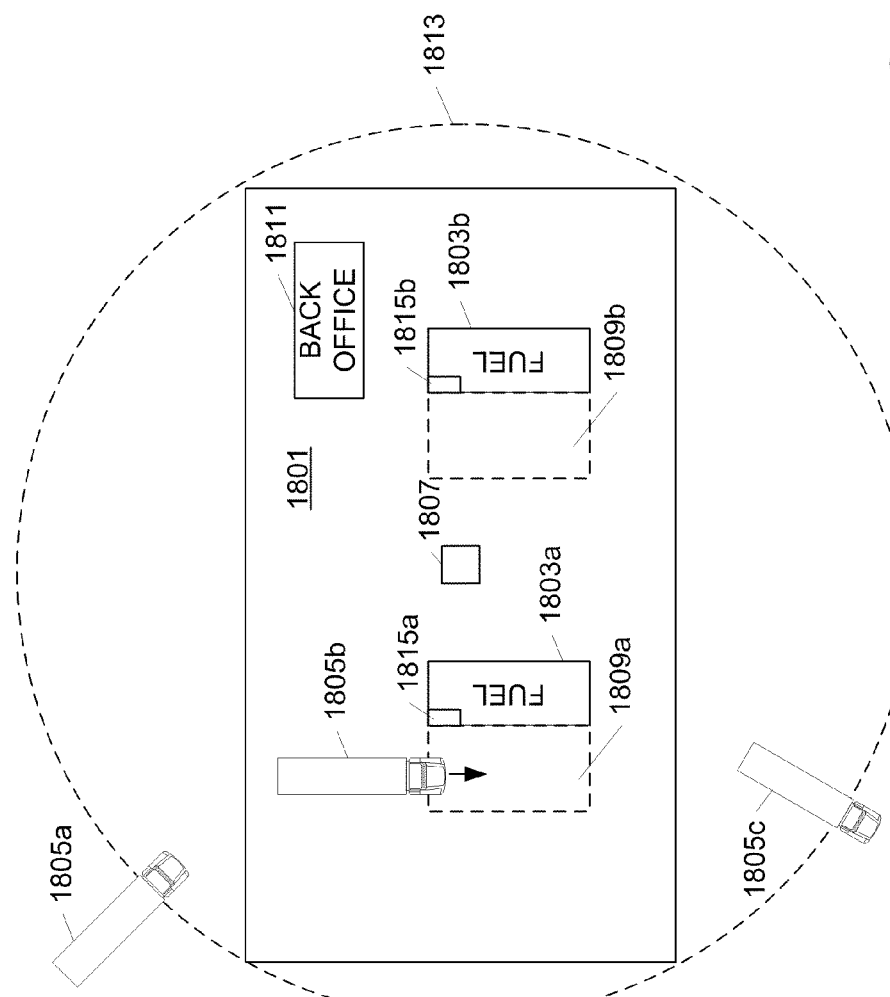

SYSTEM AND METHOD FOR PROCESSING VEHICLE TRANSACTIONS

CROSS-REFERENCE TO RELATED APPLICATIONS

The present application is a continuation-in-part of co-pending U.S. application Ser. No. 11/678,110, entitled "SYSTEM AND METHOD FOR PROCESSING VEHICLE TRANSACTIONS," and filed on Feb. 23, 2007, the content of which is incorporated herein by reference in its entirety.

FIELD OF ART

The invention relates generally to a method and a system for processing transactions from a vehicle. Specifically, the invention relates to a system and method for pre-authorizing vehicle-related sales and transactions.

BACKGROUND

In a society where the assertion "time is money" has become more fact than fiction, efficiency and punctuality have developed into highly valued assets in many industries. In the transportation and shipping industry, for example, efficiency and punctuality are defining qualities that often set successful companies apart from those that fail. Particularly, greater efficiency and punctuality may lower transportation and shipping costs, which may, in turn, reduce costs to potential clients and attract a larger customer base.

One aspect of transportation and shipping that may impact the cost and punctuality of deliveries is the need to refuel transportation vehicles. For instance, many packages and goods are delivered using trucks that often travel long distances between pick-up and delivery. Since a truck or vehicle's fuel tank is of a limited size, drivers need to occasionally break from the transportation route to refuel. Refueling time may vary greatly depending on a variety of factors including required processing time for a fuel sale and/or transaction. Typically, a driver of a transportation vehicle must enter a refueling station, park the vehicle, enter authorization and/or payment information for the transaction and wait for approval before starting to refuel. In other words, delays may be caused by communication and processing time of transaction information at a point of sale. In many instances, these aforementioned processes may take significant amounts of time thereby delaying delivery of goods and potentially increasing shipping costs. Delays in the shipping process may further have negative impacts on the recruitment of drivers as drivers might not want to spend significant amounts of time refueling and obtaining other various services. Further, in many instances, data entered by drivers might only be stored without true validation.

In some current systems, drivers are issued a card from a carrier with which they are to make transactions such as refueling, showering, purchasing food and the like. However, these cards are generally of the magnetic strip variety which can be subject to high failure rates (e.g., due to damage, wear, etc.). Moreover, the card may include a general purchase policy that might not be specific to a driver or truck. Accordingly, some drivers may take advantage of this by attempting to sell fuel or the like. Further, since the transaction card might not be tied to a specific vehicle or driver, there is the possibility of other vehicles and drivers using the card in an unauthorized manner.

Additionally, during breaks, drivers of trucks and other transportation vehicles may wish to eat a meal or take a shower. Beyond the time required to perform these tasks, drivers may need to first purchase the meals and/or services. For example, a driver may have to spend time purchasing shower time and/or access from a refueling station agent. As such, this purchasing time may further add to the delays and costs associated with shipping and delivery. Again, the delays and, in some instances, increased costs may be attributable to the time required to process transaction information in order to complete the transaction.

Still further, a driver may be required to manage documentation and information provided, received and/or generated during the processing of a sales transaction. For example, a driver may receive receipts relating to the sales of the fuel, services and/or goods. As such, drivers may often forget or lose the numerous amounts of information and documentation produced during a lengthy transportation route.

SUMMARY

Many of the aforementioned problems are solved by implementing a system and method for pre-authorizing and/or pre-processing transaction requests prior to a vehicle's arrival at a service station. A back office system may broadcast or advertise services of a particular service station to vehicles entering a wireless service area implemented by the back office system. A wireless service area, as used herein, relates to an area where a wireless communication connection may be established with the system implementing the service area. The back office system may subsequently receive transaction requests from vehicle operators who wish to use one or more services of the service station. The transaction requests may include a variety of information including, but not limited to, vehicle related information, driver related information, company or organization information and service information. A transaction request may be generated and transmitted automatically upon entering the wireless service area of the back office system. Alternatively or additionally, a transaction request may be generated and transmitted in response to a manual determination by a driver or operator. To validate and authorize the transaction, the back office system may contact a carrier or company information system associated with the vehicle and/or driver. The back office system or a carrier information system may confirm the validity of a driver or vehicle's credentials and determine whether the company or carrier has sufficient funds for the requested transaction. Upon approval, the back office system may then transmit authorization information to a point of sale at the service station. The driver and vehicle may then proceed directly to performing the requested service and/or transaction upon arriving at the station without first having to first transact with the point of sale.

According to another aspect, vehicle related information may be identified or determined through an engine control module (ECM) of the vehicle. The ECM may include or be connected to a short-range wireless communication device so that a driver's wireless communication device may retrieve vehicle data from the ECM. The short-range wireless communication device may use a variety of short-range wireless protocols including radio frequency (RF) transmissions, Bluetooth and the like. The ECM may further digitally or electronically sign data originating from the ECM to guarantee authenticity.

In yet another aspect, once a vehicle and driver arrive at a service station, the driver may activate the pump by entering a first code indicating a pre-authorized transaction. The pump may then prompt the user for a transaction code to activate the pre-authorized service. For example, once a transaction request has been processed, the back office system and/or the point of sale system may issue the requesting driver a transaction password. Once the driver arrives at the pump station, the driver may enter a pre-authorized transaction code that then allows the driver to enter the transaction password. If the transaction password entered by the driver matches the originally issued password, the pump or service system may be activated. The password and transaction code may comprise a sequence of numbers, an alphanumeric code, a series of symbols and the like.

Alternatively or additionally, a fuel pump or dispenser may scan a Radio Frequency ID (RFID) chip of the vehicle prior to activation. The RFID information may be validated by a point of sale system, which may then authorize activation of the fuel pump or dispenser. In one or more alternate embodiments, an RFID chip may be embedded in each fuel pump or dispenser. Accordingly, rather than the fuel pump scanning a vehicle's RFID, the vehicle may scan the fuel pump's RFID. The pump's RFID information may then be transmitted to the back office system for validation and for authorization to activate the pump.

Still further, a surrogate system controller may be integrated into a service station system to allow multiple point of sale systems to control the same service system (e.g., a fuel pump). The surrogate system controller connects to each of the point of sale systems and coordinates transactions and communications between each of the point of sale systems and the service system. In one example, the surrogate controller may determine whether a fuel pump is available to prevent conflicts in transactions at the same fuel dispenser. The surrogate controller may further receive transaction log information from the service system and forward the information on to the appropriate point of sale system. The surrogate controller may also store a copy of all transaction logs for auditing and record-keeping purposes.

According to yet another aspect, pre-authorization of a transaction and activation of a service system may include obtaining pre-authorization from a carrier information system including a pre-authorization code, entering a start code at a service system upon arrival at a service station, entering a pre-authorization code and obtaining validation of the transaction using the pre-authorization code and start code (e.g., from the carrier information system). Optionally, identification information of the driver or vehicle may be transmitted for validation purposes as well.

Still further, a vehicle's arrival and presence within a predefined service area may be detected using various sensors and short-range sensors and communication devices such as RFID readers and RFID tags, BLUETOOTH, short-range WiFi devices and the like. For example, a driver or a vehicle may include one or more RFID tags storing identification information. The RFID tags may be read by a reader once the tags are within a specified proximity. Accordingly, a service station may control transactions and the activation/deactivation of service systems based on whether the vehicle or driver is within the predefined service area.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which:

FIG. 18 illustrates the detection of vehicle entry into and exit from a vehicle service station and an area associated with a service system according to one or more aspects described herein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
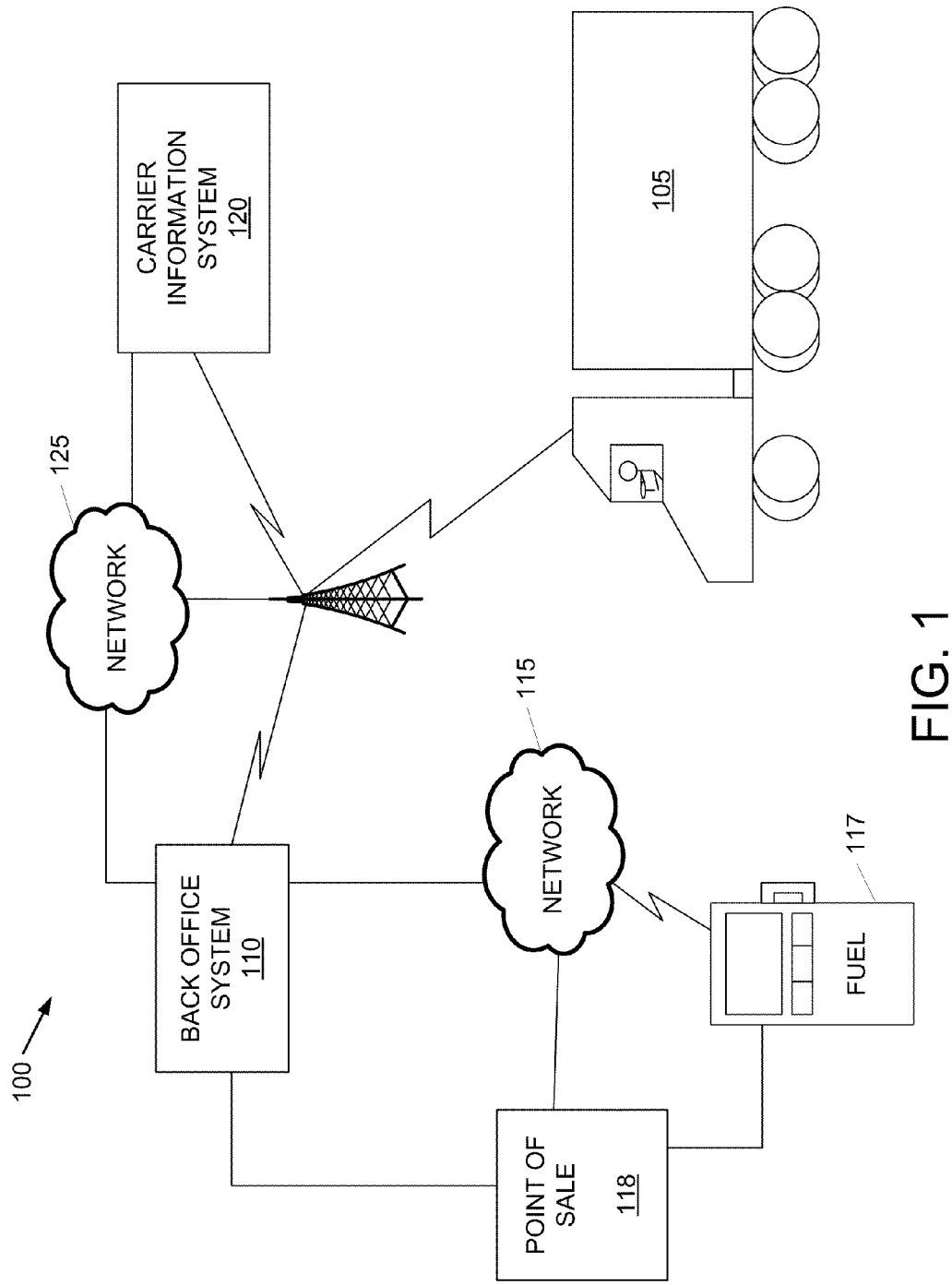
FIG. 1 illustrates a transaction authorization and processing system according to one or more aspects described herein.

FIG. 1 illustrates a transaction processing and authorization system 100 configured to function with transportation vehicles such as truck 105. Conventional sales and service transaction processing and authorization systems require a driver to enter information and authorize a transaction after the driver and vehicle have arrived at the point of sale (e.g., a fuel station). To streamline and facilitate the process, system 100 may conduct transaction authorization and processing via wireless communications prior to the arrival of truck 105 at a service station which may be referred to schematically as fuel pump/station 117. System 100 may include various facilities including fuel station 117, back office system 110 and carrier information system 120. A back office system, as used herein, generally refers to a system or infrastructure within an organization that supports various operational processes. Particularly, back office system 110 may be responsible for coordinating transactions between facilities and entities in system 100 that might otherwise have to occur in-person at, e.g., point of sale 118 of station 117. A point of sale, as used herein, refers to a system for processing transactions (e.g., authorizing and completing fuel sale transactions). Point of sale systems may process different types of transactions using different types of authorization and payment methods. In one or more arrangements, truck 105 and/or a driver thereof may pre-authorize a transaction such as a fuel sale while en route to fuel station 117 rather than upon reaching station 117. Upon arrival at station 117, the driver and truck 105 may proceed directly to completing the requested transaction at the service system, e.g., refueling at fuel pump 117, receiving other requested services and/or picking up purchased goods without having to initially engage in a sales transaction. The time that might normally be spent authorizing and processing various transactions at the station is thus saved by performing those tasks during travel/shipping time.

Back office system 110, point of sale 118 and fuel dispenser 117 may be associated with the same company or organization. In such instances, back office system 110, point of sale 118 and fuel dispenser 117 may communicate through an internal network 115 (e.g., an intranet). The internal network may, alternatively or additionally, be separate from an external network 125 such as the Internet. Alternatively, all communications may be routed over a common network.

A driver and/or truck 105 may initiate a transaction with fuel station 117 either manually or automatically. For example, a driver may manually request a transaction with station 117 in response to determining that truck 105 is low on fuel. Alternatively or additionally, truck 105 and/or a communication device (not shown) of the driver of truck 105 may automatically send a transaction request in response to a variety of trigger events. For example, truck 105 and/or a driver's communication device may automatically transmit a transaction request in response to determining that the fuel level is below 25% of capacity. Communication devices that may be used as part of the system include personal digital assistants (PDAs), cellular telephones, portable computers and the like. In one scenario, truck 105 and/or a communication device may automatically generate and issue a transaction request upon entering a wireless communication area serviced by station 117. Station 117 may employ a wireless communication network having a limited range to allow trucks such as truck 105 and/or drivers initiate various transactions once they are within the predefined range or proximity.

Further, both automatic and manual transaction requests may be generated and initiated based on a variety of other factors including the fuel level, a proximity to the closest fuel station versus a proximity to the next closest fuel station and/or an amount of continuous travel time. In one or more arrangements, truck 105 and/or the communication device may use a hybrid automatic/manual transaction request system. As an example, truck 105 and/or a communication device may prompt a driver to confirm a transaction request based on an automatic determination that a transaction request should be generated. Rather than automatically generating and transmitting the request, however, a hybrid transaction system may subsequently request manual confirmation from the driver or user prior to generation and/or transmission of the transaction request.

To facilitate processing and authorization operations, a back office system such as system 100 may create and use multiple network connections with various systems and entities in system 100. In one example, back office system 110 may establish a wireless network connection with truck 105 and/or a driver thereof to send and receive transaction related information. The wireless network connection may include satellite communication links, cellular network connections and/or wireless Local Area Networks (LAN) connections such as Wi-Fi. In one or more arrangements, back office system 110 may further include a system configured to generate a wireless service area that publishes or broadcasts the availability of pre-authorization services to trucks and/or users upon the trucks' and/or users' entry into a predefined proximity of station 117. A range of the wireless service area may be defined based on various factors including power requirements and road topology of the area. Back office system 110 may also manage connections with other entities such as fuel station 117 and a carrier information system 120 associated with truck 105. In particular, back office system 110 may access data stored in carrier information system 120 to verify and authorize transaction requests. Communications between back office 110, carrier information system 120 and fuel station 117 may be conducted using a variety of communication methods including wired and wireless communication solutions. Wired connections, for example, may include local area networks (LANs), Internet Protocol (IP) networks, satellite communication networks, cable networks and/or fiber optic communication links.

According to one or more aspects, back office system 110 may communicate with carrier information system 120 by using truck 105 and/or a communication device of the driver (e.g., cell phone, PDA, smart phone, computer, etc.) as a network intermediary. That is, truck 105 and/or the driver's communication device may forward and/or route communications between back office system 110 and carrier information system 120. Such a configuration may be adopted to protect and maintain a level of privacy and security for carrier information system 120 and the data contained and managed therein. Alternatively, back office system 110 may communicate directly with carrier information system 120 without using truck 105 and/or another communication device as an intermediate link.

Carrier information system 120 may refer to a system, database and/or device corresponding to an organization or a company associated with truck 105 and/or the driver of truck 105. In one or more instances, the organization or company may be a carrier or shipping company. The carrier information system 120 may include a database storing operations information. For example, a carrier information system 120 may store and maintain data relating to shipping routes, delivery times, truck and/or driver assignments, costs and the like. Carrier information system 120 may further receive data and/or input from various sources including truck 105, a driver and/or a third party system such as back office 110. Back office 110, for instance, may send sales and transaction receipts and records to carrier information system 120 corresponding to sales and transactions made by the driver of truck 105. Truck 105 may further transmit location information to carrier information system 120 to allow the carrier company to track the progress of a shipment or delivery.

Alternatively or additionally, carrier information system 120 may implement authorization and security protocols that prevent unauthorized users from accessing system 120. For example, drivers may be required to log in to system 120 prior to viewing and/or editing information thereto. In one or more configurations, third party systems may be required to register with carrier information system 120 to receive full access. Accordingly, a known third party system such as back office system 110 may be assigned unique identification codes for accessing information system 120. Unknown systems and/or users, on the other hand, might only be authorized to use system 120 in a limited or specific capacity. For example, a back office system that is not registered with carrier information system 120 might only be allowed to view publicly available information such as truck identification numbers and the like.

Figure 2:
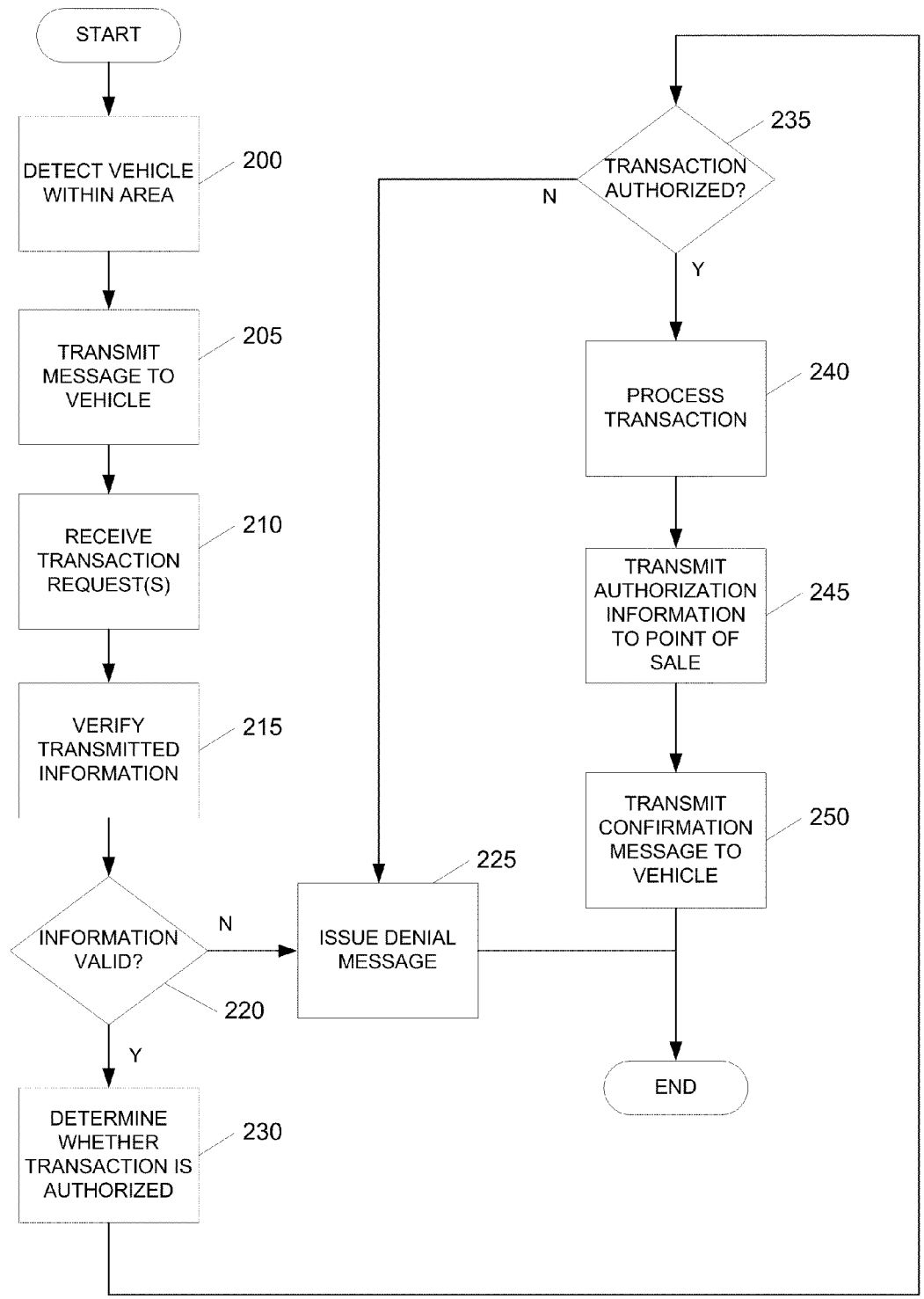
FIG. 2 is a flowchart illustrating a method for pre-authorization and pre-processing vehicle transaction requests according to one or more aspects described herein.

FIG. 2 is a flowchart illustrating a method for pre-authorizing and processing a vehicle transaction request. In step 200, a vehicle's entry into a predefined wireless service area associated with a particular fuel and/or service station may be detected. In one example, a back office system such as back office 110 of FIG. 1 may detect a signal from a wireless communication device of a vehicle and/or a driver once they enter the wireless service area generated by the back office system. In response to detecting the entry of a vehicle and/or wireless communication device associated therewith into the wireless service area, a message may be transmitted to the vehicle and/or wireless communication device in step 205. The message may include a welcome message identifying the fuel and/or service station associated with the back office system. The message may further provide information regarding services and goods available at the station and/or that may be pre-purchased or pre-ordered.

Figure 3:
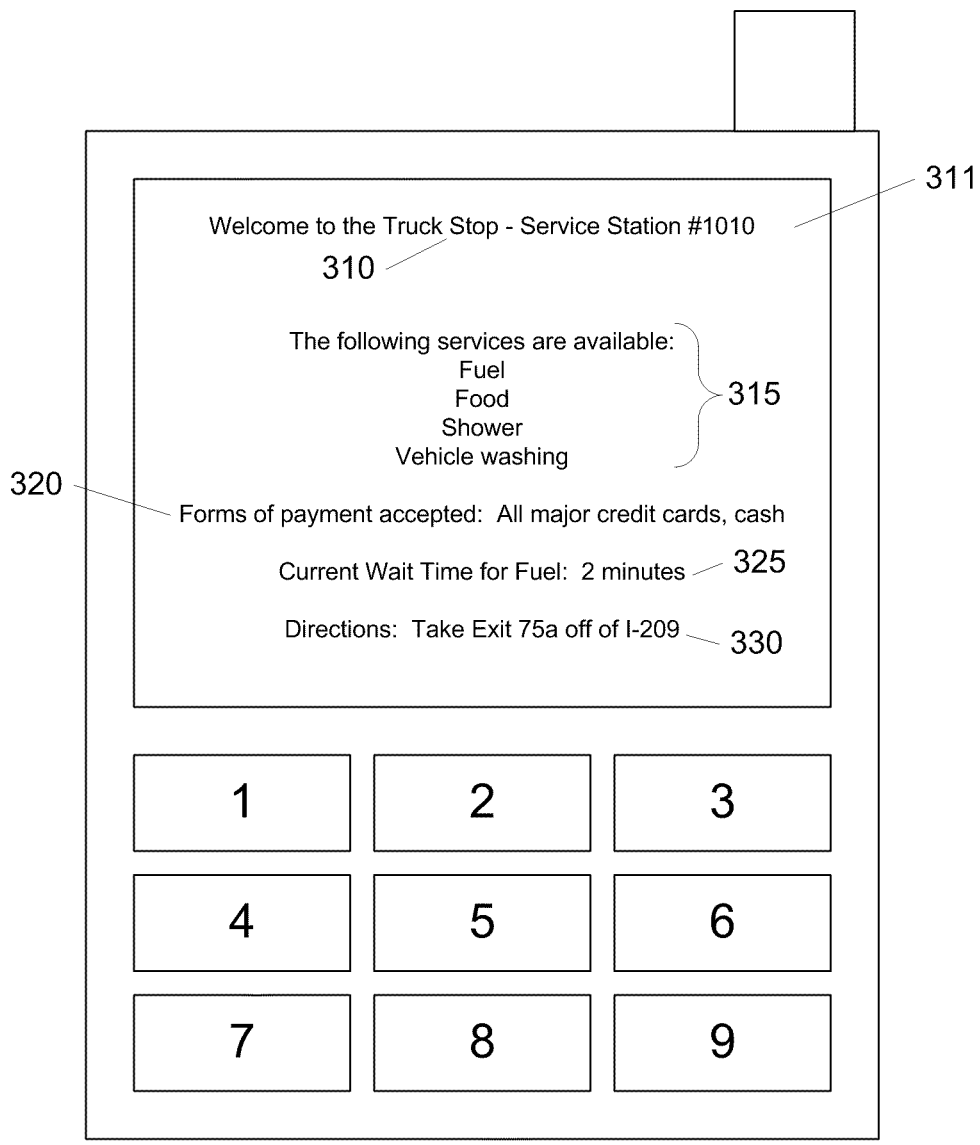
FIG. 3 illustrates a welcome message displayed on a user interface of a communication device according to one or more aspects described herein.

FIG. 3, for example, illustrates a user interface 300 of a communication device 301 displaying a greeting message 302 received from a service station. Greeting message 302 includes a name 310 and ID number 311 corresponding to the sender service station, services and goods available 315, accepted forms of payment 320, a current wait time 325 and directions 330. Services available 315 may indicate all services and/or goods available at the station or, alternatively, might only list those services and/or goods for which transactions may be pre-authorized and/or pre-processed. In addition, to aid a driver's decision as to whether he or she wishes to use the services of the station, current wait time 325 may be provided to reflect how long the driver may be expected to wait before receiving requested services and/or goods (e.g., fuel). Wait time 325 may be calculated in a variety of ways including by determining an average wait time associated with a previous number of vehicles. Wait time 325 may also be based on a time of day, time of year and/or the services/products most requested. Further, directions 330 may be transmitted to aid a driver in finding the station.

Referring again to FIG. 2, the welcome message may be transmitted in multiple ways and formats including by text message, by video messaging, picture messaging, audio messaging and/or combinations thereof. In one or more instances, a driver or truck's communication system may include pre-installed software configured to interact with back office systems and fuel stations. For example, a back office system and/or a fuel station may be able to create pop-up messages on a truck or driver's communication device using the pre-installed software. Alternatively, a back office system may transmit messages using conventional methods that do not require the installation of software on a driver or truck's communication device. Conventional messaging techniques include text, video, picture and/or audio messaging over a communication link such as a cellular network and/or transmitting multimedia messages over the Internet. One of skill in the art will appreciate that a variety of transmission methods may be implemented to convey messages to a wireless communication device.

In step 210, one or more transaction requests may be received from a vehicle or a device of a driver of the vehicle. A transaction request may include various types of information including a vehicle ID associated with the vehicle from which the transaction originates and/or an identifier, e.g., a license or ID number, corresponding to the driver. Vehicle related information may be obtained in a variety of ways including from an engine control module (ECM) using short-range wireless communications. Methods for determining and/or obtaining truck related information is discussed in further detail below. Other pertinent information that may be relayed along with the transaction request may include a requested transaction type, company or organization information, other services requested and/or form of payment. In one or more arrangements, a transmission configured to carry a transaction request may hold and transmit multiple requests. For example, a single transmission from a vehicle or driver may include requests for fuel, a shower reservation, preventative maintenance and food. In systems where communications are charged based on a number of transmissions, the ability to include multiple requests in a single transmission may further help to reduce costs.

Once the one or more transmission requests have been received, information transmitted via the request(s) such as identification information of the requestor (e.g., a requesting truck and/or driver) may be verified in step 215. One method of validating the identification information provided in the transmission request(s) is by confirming the information with a carrier information system such as carrier information system 120 in FIG. 1. A carrier or information system associated with the requestor may be determined from the information included in the transmission request(s). For example, the requestor may explicitly identify a carrier or carrier information system for validating the request information. Alternatively or additionally, a back office system or fuel station may have an internal database associating a truck, driver and/or truck-mounted device ID with a carrier. The internal database may further identify the address and/or contact information corresponding to the carrier based on a priori knowledge, e.g., provided during an initial registration process or sign-up procedure. In one or more arrangements, the internal database may further be used to verify that carrier information received from a requestor does indeed correspond to the requestor's ID prior to validation with the carrier information system.

If the requestor identification information is determined to be invalid in steps 215 and 220, the transaction request may be denied. For example, a denial message may be transmitted to the requestor's communication device in step 225. Alternatively or additionally, a message confirming the information transmitted may be sent to the requestor to provide another validation opportunity. If, however, the requestor identification is validated in steps 215 and 220, a back office system and/or fuel station may then determine whether the transaction or transactions are authorized in steps 230 and 235. The process of authorization may include a variety of steps including determining whether an identified carrier associated with the requestor has sufficient funds to pay for the transaction. Authorization may also relate to determining whether the requestor is authorized by his or her carrier to make purchases or receive cash advances of above a certain amount of money. For example, a carrier may restrict its drivers to purchases at a single station of $40 or less (not including fuel). Accordingly, a transaction request for purchasing $50 dollars worth of specified products would be determined to be unauthorized by the carrier.

If, in steps 230 and 235, a determination is made that the transaction is unauthorized, a denial message may be transmitted to the requestor in step 225. However, in one or more instances, a denial message may include an opportunity for the requestor to revise his transaction request and/or related information. If, on the other hand, a determination is made in steps 230 and 235 that the transaction request or requests are authorized, the requested transaction or transactions may be processed by the back office and/or fuel station in step 240. For example, back office system may process payment authorization for the transaction. Similarly, if a driver requested a service such as a shower reservation, a reservation calendar may be consulted to determine if a requested time is available. Alternatively, if a specific time was not requested, an available slot may be assigned to the driver.

Once the transaction is authorized, the back office system may further transmit authorization information to the point of sale identifying the authorized transaction and providing truck/driver information in step 245. Thus, upon the truck and driver's arrival, the point of sale at the fuel station might not need to verify the transaction with the back office system. In step 250, a welcome and/or authorization message may be sent to the requestor's communication device indicating that the transmission request was authorized and processed. The welcome and/or authorization message may also include other information such as a pump number or ID for fueling, advertisements and/or one or more particulars regarding the services and/or goods requests in the driver's transaction request or requests. In one example, a shower reservation time and/or code may be indicated in a welcome and/or authorization message. The welcome and authorization messages may further be displayed on electronic signage at the fuel station or on a point of sale system (e.g., a fuel pump screen).

In or after any of the steps of the above described method, a confirmation may further be sent to the requestor to confirm the operations being performed or to be performed. For example, in step 250, confirmation may be requested to verify that the driver is still interested in making the now-authorized transactions at the station. Since payment might not have been processed yet, a driver may still have the option to decide against making the originally requested transactions. A driver may change his mind for a variety of reasons including a dislike of an assigned shower reservation time.

Figure 4:
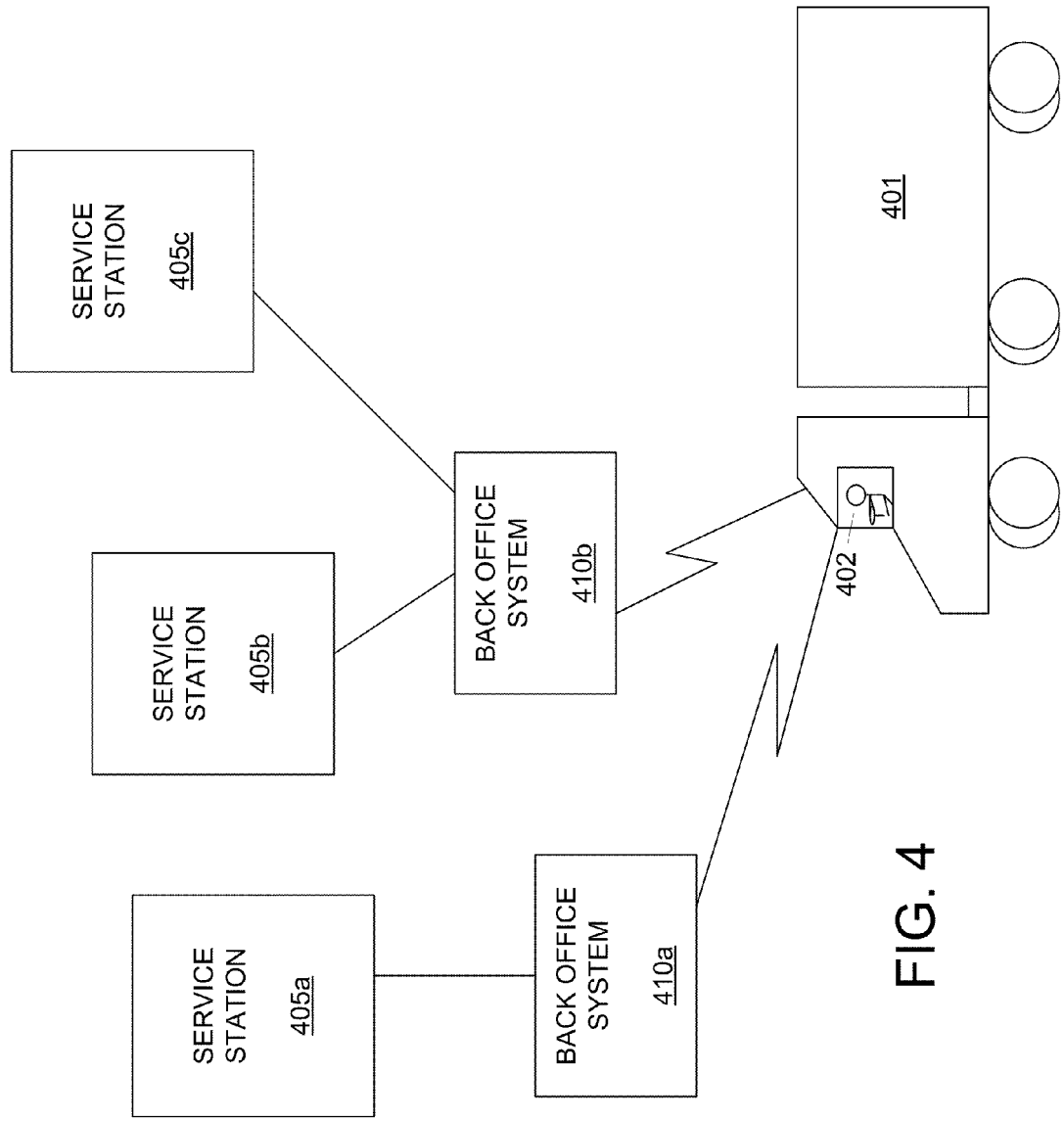
FIG. 4 illustrates a truck and driver transmitting a transaction request to multiple stations and/or back offices according to one or more aspects described herein.

According to one or more aspects, a truck 401 and/or driver 402 may transmit a transaction request to multiple stations 405*a*, 405*b* and 405*c* and/or back offices 410*a* and 410*b* as is illustrated in FIG. 4. Driver 402 may be motivated to request transactions from multiple stations 405*a*, 405*b* and 405*c* to determine which station or stations 405*a*, 405*b* and/or 405*c* have the lowest rates, are able to meet all of his or her requests and/or advertise the shortest waiting time. A variety of other station factors may also be considered including station reputation and convenience to truck 401's route. In one or more scenarios, driver 402 might only transmit requests to stations 405*a* and 405*b* within a certain proximity to driver 402's current location. For example, stations 405*a* and 405*b* may be within 5 miles of driver 402 and truck 401's current location whereas station 405*c* may lie outside of this threshold distance. As such, in such scenarios, only stations 405*a* and 405*b* might receive the transaction request. In one or more situations, driver 402 and/or truck 401 might only send transaction requests to stations 405*a*, 405*b* and/or 405*c* that are within their carrier's network.

According to one or more configurations, a carrier information system (not shown) associated with driver 402 or truck 401 may determine and identify a station from stations 405*a*, 405*b* and 405*c* according to one or more preferences. For example, driver 402 or truck 401 may initiate a transaction request and transmit the request to the carrier information system. The carrier information system may then relay the transaction request to each of stations 405*a*, 405*b* and 405*c* and identify one of stations 405*a*, 405*b* and 405*c* that best match one or more criteria (e.g., lowest fuel cost, availability of showers, etc.). The carrier information system may then notify driver 402 and truck 401 of the selected stations (e.g., stations 405*a*, 405*b* or 405*c*).

To transmit a request to multiple stations 405*a*, 405*b* and 405*c*, driver 402 and/or truck 401 may send individual messages designated for each of stations 405*a*, 405*b* and 405*c*. That is, back office 410*a* associated with station 405*a* may receive a transaction request message for station 405*a* while back office 410*b* associated with stations 405*b* and 405*c* may receive two transaction request messages, one for each of stations 405*b* and 405*c*. Alternatively, driver 402 and/or truck 401 may send a single transmission to back office 410*b* designating both stations 405*b* and 405*c* as recipients, rather than transmitting two individual messages (one for each of stations 405*b* and 405*c*). Such a method may help save communication costs.

Figure 5:
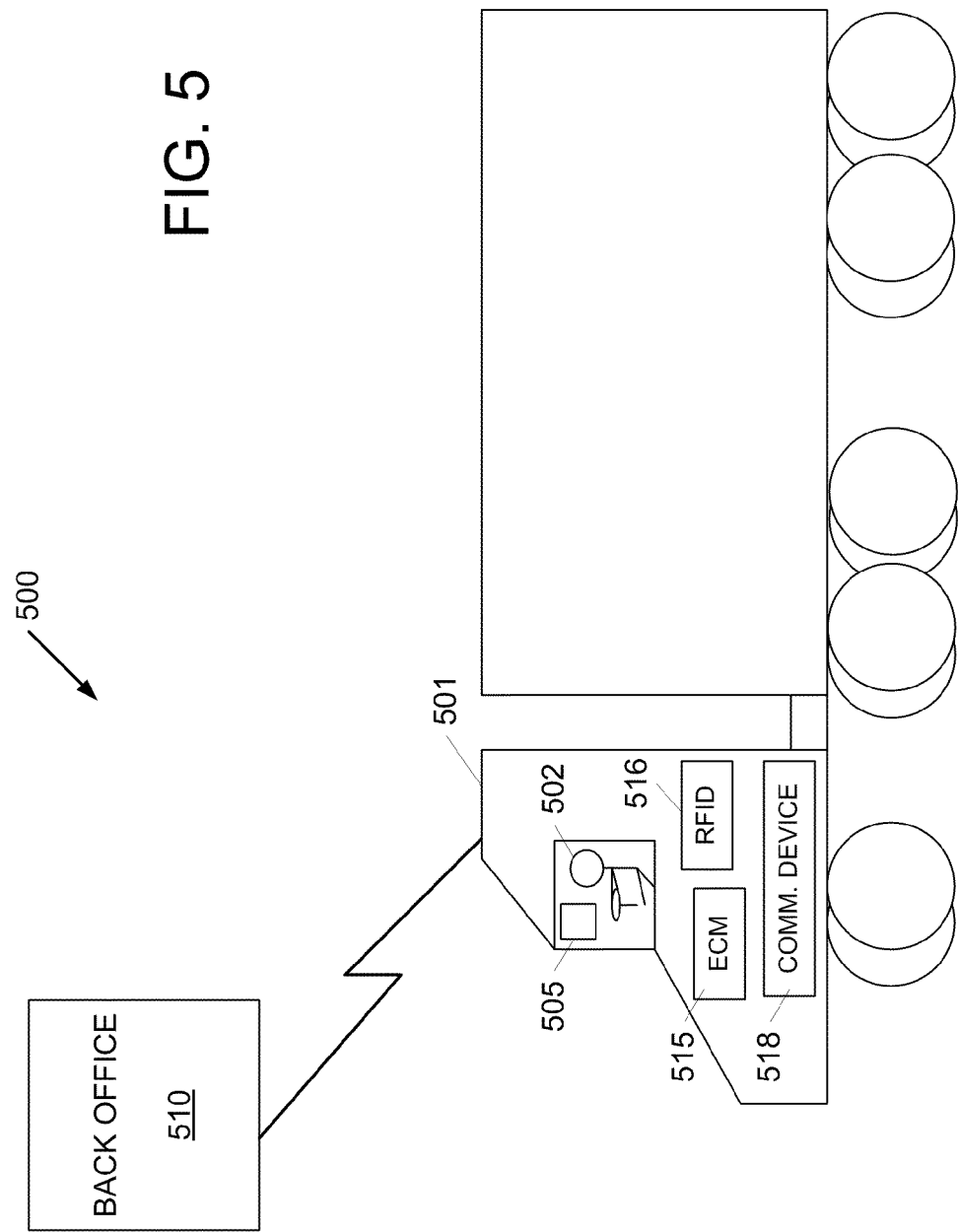
FIG. 5 illustrates a system for obtaining and determining truck related information according to one or more aspects described herein.

Many of the aspects and features described herein relate to the transmission and use of truck and driver identification information. For example, transaction requests may include various types of truck identification information for authorization and verification purposes. FIG. 5 illustrates a system 500 for determining and obtaining truck related information. System 500 includes truck 501, driver 502, communication device 505 and back office 510. Additionally, truck 501 may include multiple components and systems including ECM 515, radio frequency ID (RFID) chip 516 and/or internal communication device 518. Communication device 518 may be one of any number of communication systems including a mobile transceiver and/or a radio communication device. Each of ECM 515 and RFID chip 516 may be used to digitally or electronically sign transmissions sent from truck 501 through communication device 518 or from driver 502 through external communication device 505. For example, ECM 515 and RFID chip 516 may both store a serial number or code unique to truck 501. The unique serial number or code may be encrypted to prevent tampering and hacking.

ECM 515 may further be configured to manage the operation of truck 501's engine and other components. As such, ECM 515 may store a variety of truck related information such as fuel consumption, distance traveled, fuel efficiency and the like. ECM 515 may further be used to time stamp transmissions, maintenance logs and trip logs. Accordingly, truck 501 and/or driver 502 may automatically retrieve and/or transmit requested information from ECM 515 rather than manually determining and entering and transmitting the data. In one example, driver 502's external communication device 505 may be used to extract data from ECM 515 through either a wired or wireless connection established there between. External communication device 505 may subsequently transmit the extracted data to another system such as back office 510. Wireless communication methods and protocols that may be used include both short- and long-range communication techniques such as radio frequency (RF) transmissions, Bluetooth protocols and infrared connections. In one or more arrangements, communications of ECM 515 may be coordinated and facilitated through internal communication device 518. In addition, predefined levels of encryption and security may be used and/or installed to prevent tampering by driver 502. For example, the data stored and/or generated by ECM 515 may be digitally signed by ECM 515 prior to transmission to another system such as communication device 505 or back office 510. Alternatively or additionally, any transmission originating from truck 501 and/or driver 502 may be digitally signed and/or anchored by ECM 515.

Figure 6:
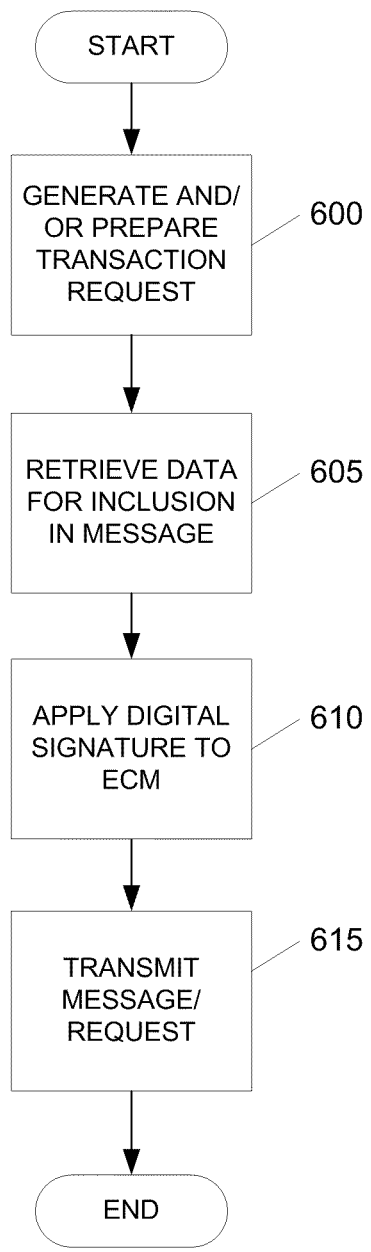
FIG. 6 illustrates a method for determining and obtaining truck related information according to one or more aspects described herein.

FIG. 6 is a flowchart illustrating a method for determining truck related information and anchoring a transmission. In step 600, a message may be generated and/or otherwise prepared by a truck and/or driver. The message may correspond to a transaction request or may include a response to a request for information from one or more entities. For example, a carrier may request trip log information from a driver's wireless communication device and/or a truck's internal communication system. Based on the type of message being generated, various types of information may be retrieved and/or determined and stored in the message in step 605. Once the message has been prepared and is ready for transmission, a digital signature may be obtained from an ECM and applied to the message in step 610. The digital signature may include, for example, a private key of a public/private key pair. The message may then be encrypted using the private key. Alternatively or additionally, the digital signature may include truck specific information such as an ID. The truck specific information may be stored to the message as authentication and/or source data. In step 615, the signed message may then be transmitted to a destination device or system.

Figure 7:
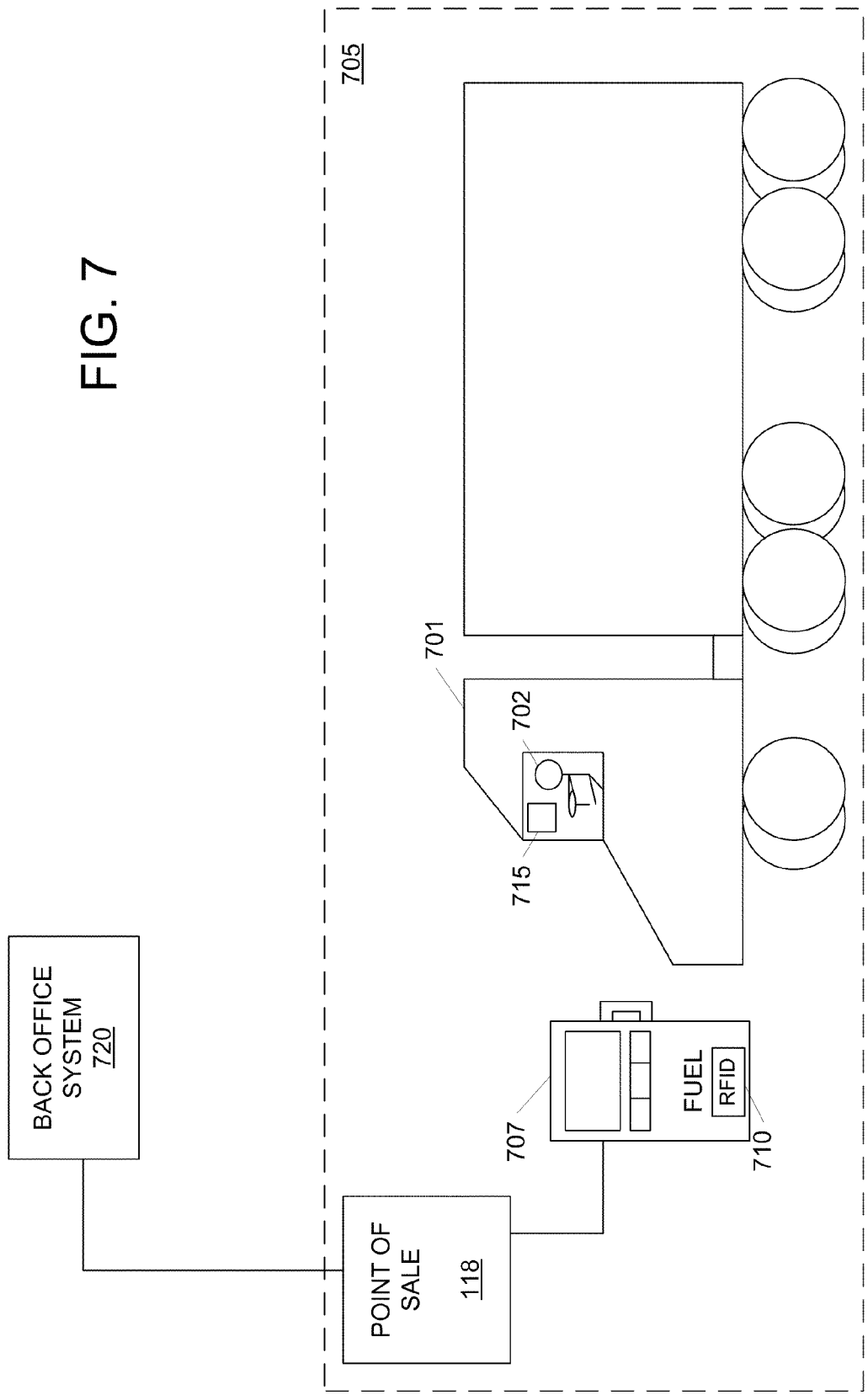
FIG. 7 illustrates a fuel dispenser system according to one or more aspects described herein.

In FIG. 7, once a driver 702 and/or truck 701 has obtained an approval for a transaction and arrives at the station 705, driver 702 and truck 701 may proceed directly to fuel pump or dispenser 707. To further streamline fuel transactions, fuel pump 707 may include an identification device such as RFID chip 710 to facilitate automatic activation of pump 707. In particular, driver 702 may use a wireless device such as communication device 715 to scan RFID chip 710 and transmit identification information stored in chip 710 to an activation system such as back office system 720. In one or more arrangements, truck 701 may include an internal communication system (not shown) that may automatically detect and scan RFID chip 710. The internal communication system may further automatically transmit the RFID information to back office system 720 to activate pump 707. Back office system 720 may, in turn, transmit an activation command to a point of sale (not shown) at the fuel station for activating pump 707.

According to one or more aspects, upon truck 701 and driver 702 reaching pump 707, back office system 720 may be configured to authorize activation of pump 707. Back office system 720 might only authorize the activation of pump 707 upon verifying that truck 701 is authorized to conduct such a transaction. In one or more configurations, pump 707 may include a communication device (not shown) configured to read information from an RFID chip (not shown) or other identification device of truck 701. Accordingly, activation of pump 707 may depend on pump 707 transmitting identification information read from truck 701's RFID chip to a point of sale (not shown) for verification.

In one or more arrangements, driver 702 may activate pump 707 by entering an activation code issued by back office system 720 at point of sale 118. For example, upon authorizing a driver 702's transaction pre-authorization request, back office system 720 may generate and issue a unique authorization code to driver 720. Back office system 720 may further store the authorization code in association with the services requested and authorized. Alternatively or additionally, back office system 720 may transmit the authorization code and authorized services to point of sale 118 and/or pump 707. Thus, upon arriving at the fueling station and pump, driver 702 may enter the authorization code in point of sale 118 or pump 707 to activate pump 707. The authorization code may further be entered to activate other service systems such as a shower or for payment for a meal. According to one or more aspects, an authorization code might not be entered until driver 702 initiates an authorization code entry mode. For example, driver 702 may activate the authorization code entry mode by entering a mode code or a mode key (or combination of keys).

Figure 8:
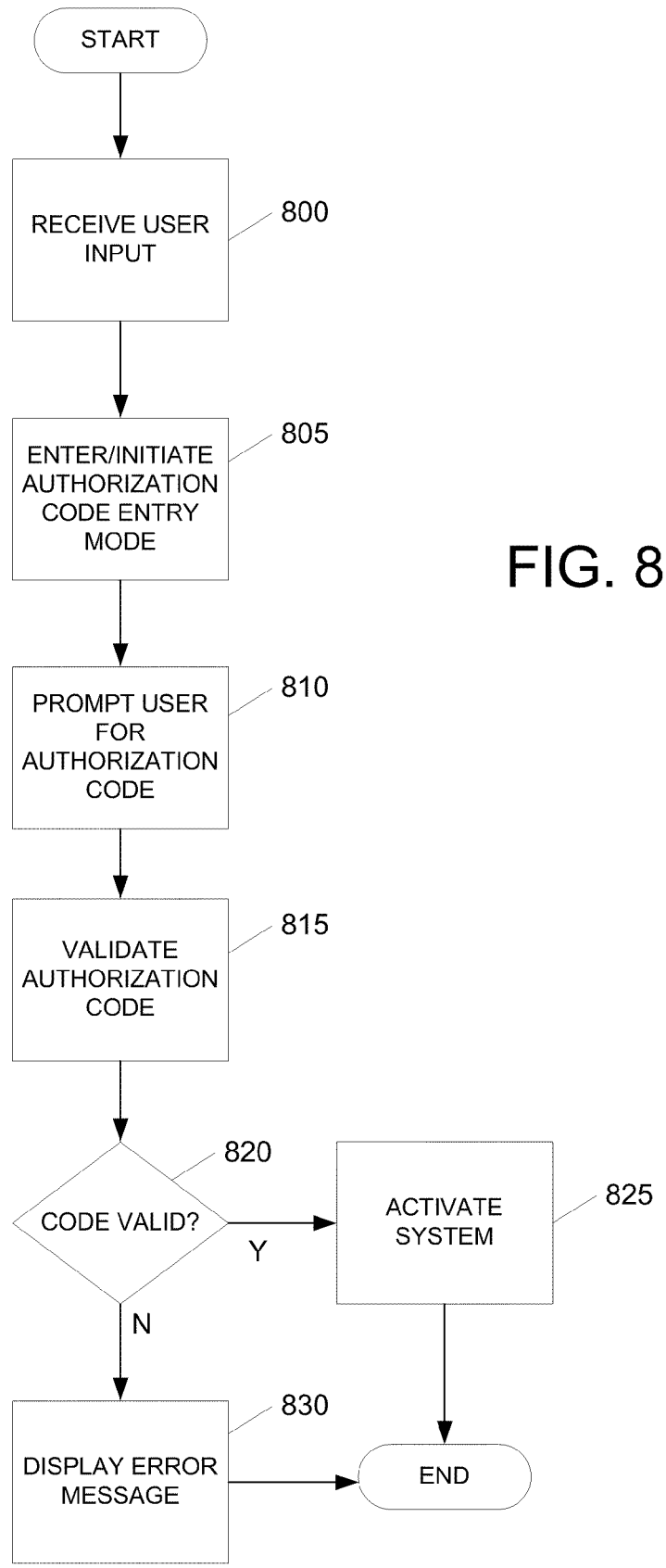
FIG. 8 is a flowchart illustrating a method for activating a service system using an authorization code according to one or more aspects described herein.

FIG. 8 is a flowchart illustrating a method for activating a service system at a point of sale, such as a fuel pump, using an authorization code. In step 800, the point of sale may receive user input from a user (e.g., a truck driver) corresponding to an authorization code entry mode. The input may include an alphanumeric code, a numeric code, a series of symbols and the like. For example, a driver may initiate an authorization code entry mode by inputting "*123." In response to the user input, in steps 805 and 810, the point of sale system may enter the authorization code entry mode and prompt the user for an authorization code, respectively. As previously discussed, the authorization code may be issued by a back office system associated with the point of sale at the time a transaction is pre-authorized. In steps 815 and 820, the point of sale system may then determine whether the authorization code is valid. For example, the point of sale system may transmit the authorization code to a back office system or point of sale for verification. Alternatively or additionally, the point of sale system may independently determine if the code is valid. If the authorization code is determined to be valid, the point of sale system may then be activated in step 825. If, on the other hand, the authorization code is invalid, the system may display an error or invalid authorization code message in step 830. According to one or more configurations, an authorization code may be entered and validated directly at the pump. That is, a driver may enter the authorization code into the fuel pump or service system.

Figure 9:
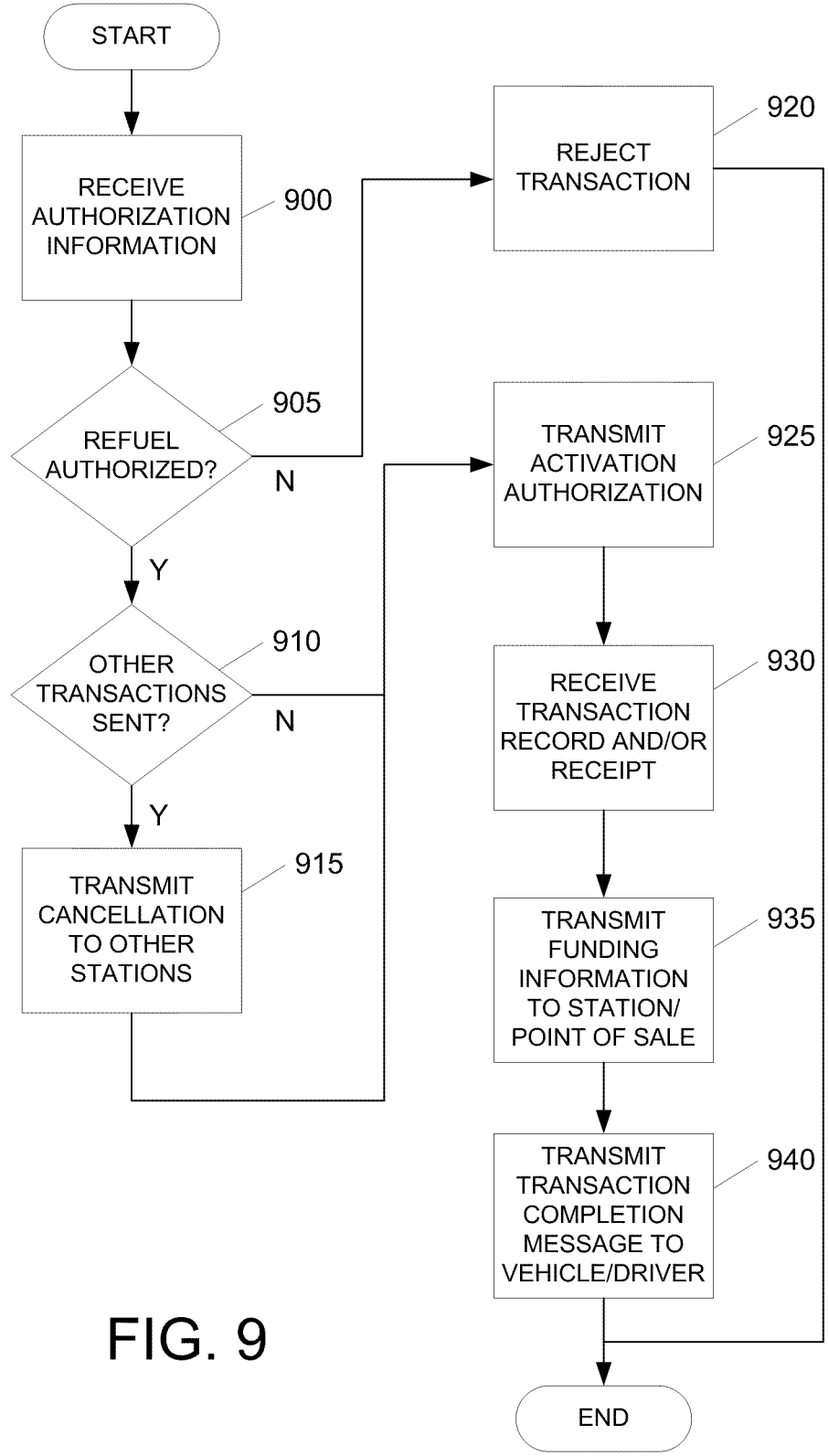
FIG. 9 is a flowchart illustrating a method for activating a fuel dispenser according to one or more aspects described herein.

FIG. 9 is a flowchart illustrating a method for activating a pump upon a vehicle's arrival at a fuel station and completing a transaction. In step 900, a back office system may receive identification and/or other authorization information associated with the vehicle and the fuel pump. For example, a driver may enter an authorization code into the pump, which may then transmit the code to the back office system for verification. In another example, a driver's communication device may scan a pump's RFID and transmit the pump's identification information along with truck information to the back office system. Once the information is received, the back office system may determine whether the truck and/or driver are authorized to refuel at the station and/or pump in step 905. One method of making such a determination is by searching a database of pre-authorized transaction requests. In the scenario where the driver and/or truck are issued a pre-authorization code, the back office system may determine whether the pre-authorization code is valid (e.g., whether it is stored in a database of valid codes). If the truck and/or driver are authorized to refuel at the station, the back office system may further determine whether multiple transaction requests were sent to multiple stations by the truck and/or driver in step 910. If so, in step 915, the back office system may send a cancellation message to all other fuel stations and/or points of sale to which a transaction request was sent. If the transaction is not authorized, then a denial message may be sent to the truck, driver and/or pump in step 920.

In step 925, after the transaction, truck and/or driver have been validated, the back office system may issue a message to the fuel station and/or point of sale requesting activation of the identified pump. With the pump activated, the driver is free to refuel his or her vehicle and complete the transaction. Once refueling is complete, back office system may receive a transaction record and receipt from the point of sale in step 930. The receipt may include an image of the receipt as well as associated data such as fuel cost, tax and the like. In response, the back office system may provide funding or payment information to the fuel station in step 935. For example, the back office system may provide the fuel station with an authorization code and account information for deducting the transaction cost. Further, the back office system may also send a completion message to the truck/driver or the carrier or both in step 940 signaling that the transaction has been concluded.

According to one or more configurations, the pump or point of sale may determine whether a transaction has been pre-authorized without having to consult the back office system. Such a method may include the back office system transmitting authorization and transaction information to the point of sale prior to arrival and activation by the requesting driver. As such, when the driver arrives at the fuel station or other service system, the pump or point of sale may independently determine whether activation is authorized without having to request verification from the back office system.

Figure 10:
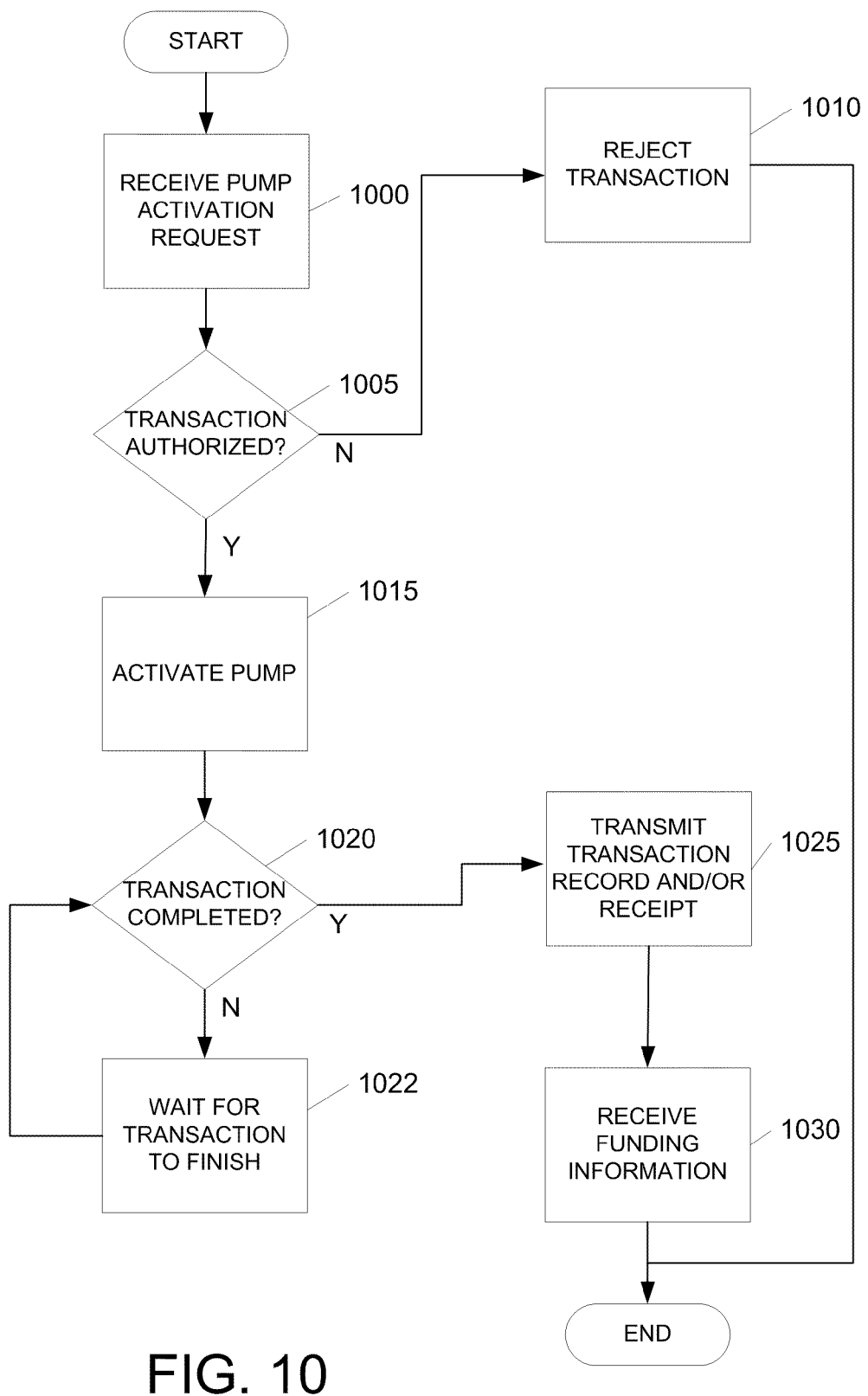
FIG. 10 is a flowchart illustrating another method for activating a fuel dispenser according to one or more aspects described herein.

FIG. 10 is a flowchart illustrating another method for activating a pump at a fuel and/or services station upon the arrival of a vehicle. In step 1000, a point of sale at a service station may receive a pump activation request from a pump. The pump activation request may include a variety of information including a transaction ID, a truck and/or driver ID and a pump ID. The information may be obtained by using a scanner and/or communication device of the pump to read an RFID chip of the truck. Alternatively or additionally, the information may be obtained by user entry through the pump. Other truck related information may be obtained by communicating with an ECM of the truck and/or a communication device of the driver. In step 1005, the fuel station office may then determine whether the transaction was previously authorized based on one or more authorization messages received from a back office system (e.g., step 255 in FIG. 2). In one example, a fuel station may store transaction authorizations in a database and determine whether transaction information received in an activation request corresponds to any of the stored transaction authorizations. If the transaction was not previously authorized by the back office system, the fuel station may send a rejection or denial message to the pump in step 1010.

If, on the other hand, the transaction was previously authorized, the fuel station office may activate the pump from which the activation message originated or which was identified in the message in step 1015. The point of sale may further detect when the fueling transaction has completed in steps 1020 and 1022. For example, the fuel station may detect that fuel has stopped flowing from the pump. Once the transaction is complete, the fuel station may then transmit a transaction log, receipt and/or other transaction related data to the back office system in step 1025. The fuel station may provide such information for the purposes of transaction authentication and payment request. Accordingly, in response to the transaction log, receipt and/or other data, the fuel station or the point of sale may receive payment information in step 1030.

Figure 11:
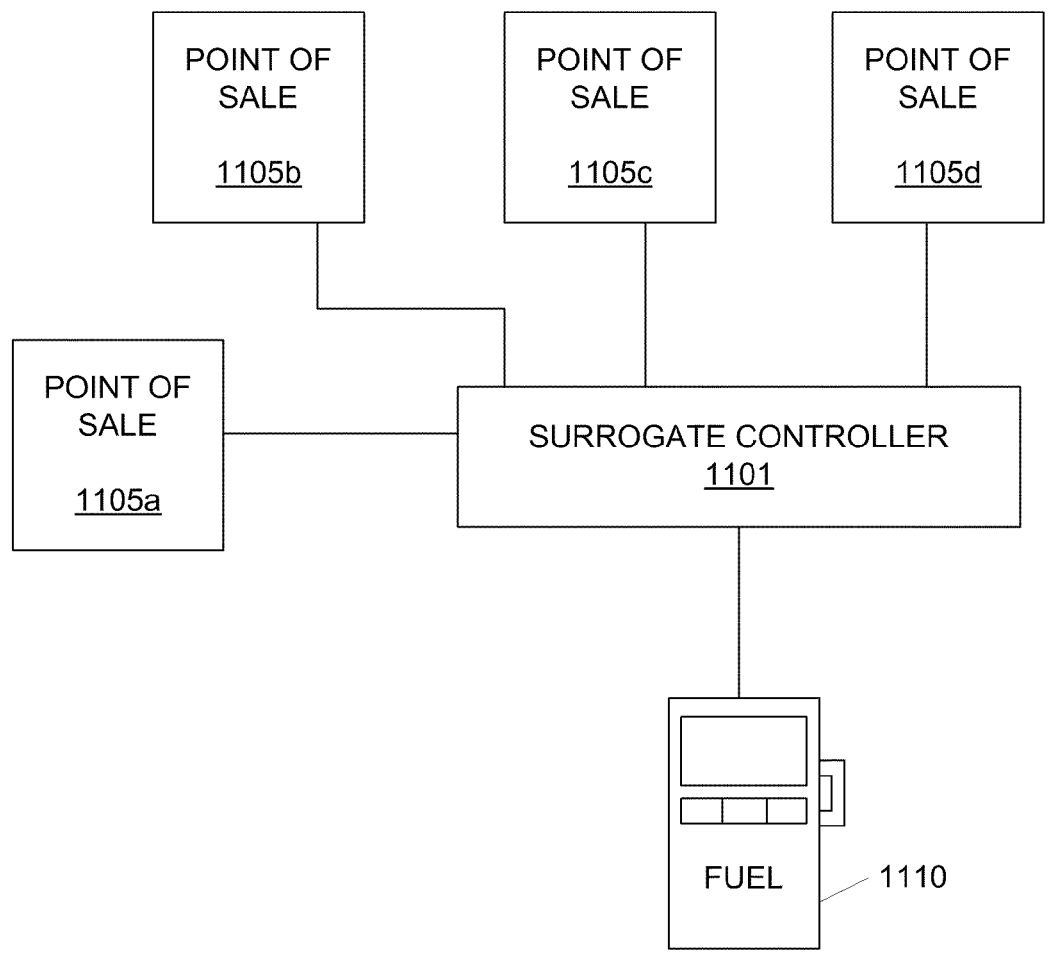
FIG. 11 illustrates a system for controlling and managing a service system for multiple point of sale systems according to one or more aspects described herein.

FIG. 11 is a diagram illustrating another system configured to activate pumps or other service systems in response to commands from multiple point of sale systems. In conventional pump activation systems, a point of sale system controls one or more dispensers (i.e., pumps) using one or more dispenser controllers. However, dispenser controllers are only controllable by a single point of sale system. That is, no management system is provided to allow multiple point of sale systems to control a single dispenser. In the system of FIG. 11, however, surrogate pump controller 1101 is implemented to manage control of dispenser 1110 by one or more of point of sale systems 1105a, 1105b, 1105c and 1105d. For example, different types of transactions at the same fuel station may be processed and managed by different point of sale systems 1105a, 1105b, 1105c and/or 1105d. As such, each of point of sale systems 1105a, 1105b, 1105c and 1105d may require access to all of the fuel station's pumps, including dispenser 1110. Thus, surrogate controller 1101 may log information and direct transmission based on which transaction is currently being performed at dispenser 1110. As an example, point of sale system 1105b may request activation of dispenser 1110 for transaction ID #5928. In response, surrogate controller 1101 may verify that the activation request is authorized and subsequently activate dispenser 1110. Upon completing of a transaction, dispenser 1110 may return data such as transaction cost and an amount of fuel dispensed to surrogate controller 1101 which may then transfer the data to point of sale system 1105b. Accordingly, each point of sale system 1105a, 1105b, 1105c and 1105d might only be provided with information corresponding to the transactions which they manage. In one or more configurations, surrogate controller 1101 may further include inventory accounting systems for tracking fuel dispensation statistics of dispenser 1110 and one or more corresponding transactions.

Figure 12:
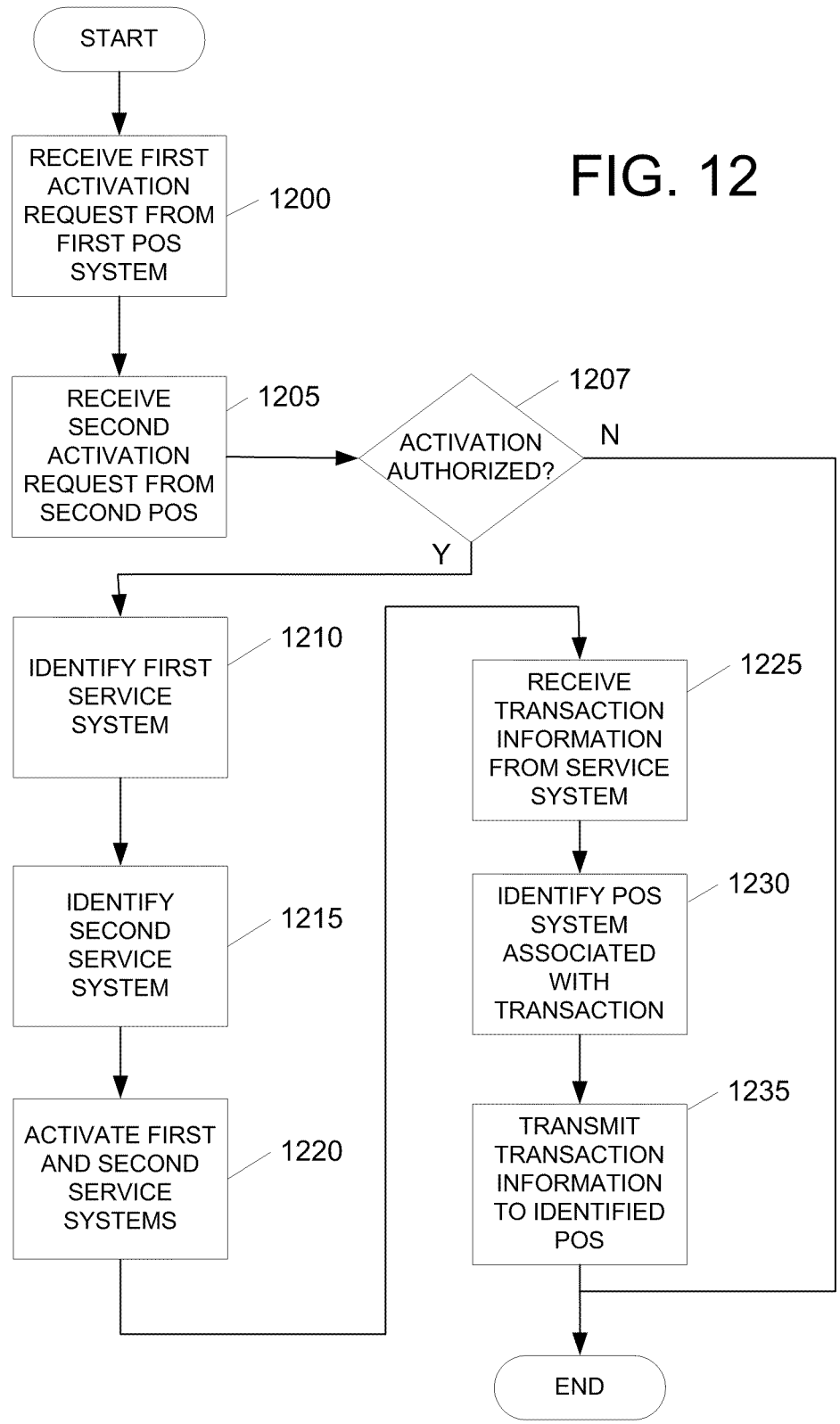
FIG. 12 is a flowchart illustrating a method for controlling and managing a service system for multiple point of sale systems according to one or more aspects described herein.

FIG. 12 is a flowchart illustrating a method for managing a service system such as fuel dispenser 1110 (FIG. 11) for multiple point of sale systems. Multiple point of sale systems may be used at a service station to handle multiple types of transactions. In step 1200, a first activation request associated with a particular transaction ID may be received, at a surrogate controller, from a first point of sale system. In step 1205, a second activation request may be received from a second point of sale system. In one example, the first point of sale system might only be used for pre-authorized transactions while the second point of sale system may handle all other types of transactions. In step 1207, the surrogate controller may verify that the transactions corresponding to the first and second activation requests are authorized. For example, the controller may look for an authorization flag in the activation request. In steps 1210 and 1215, once the controller verifies that the activation requests are authorized, the controller may identify a first service system and a second service system corresponding to each of the activation requests, respectively. The identification process may be facilitated by a driver identifying a particular service system as part of an activation request. This identification may, in one or more instances, be in the form of a numeric or alphanumeric ID number. Once identified, the first service system and second service system may be activated in step 1220. For example, the surrogate controller may transmit a signal to the service systems directly or through an intermediary such as one or more dispenser controllers.

Upon completion of the transaction, transaction log information may be received from the service system in step 1225. For example, a cost associated with the transaction as well as an amount of fuel dispensed may be reported. In step 1230, the first point of sale system may be identified from multiple point of sale systems as the appropriate recipient of the transaction log information. The identification and determination may be made, in one example, by comparing a transaction ID transmitted along with the transaction log information with a transaction ID which may have been stored when the service system was activated. Once the corresponding point of sale system is determined, the transaction log information is transmitted thereto in step 1235. In one or more arrangements, a copy of the transaction log information may be stored locally in the surrogate control system, for various purposes including auditing and record keeping.

Figure 13:
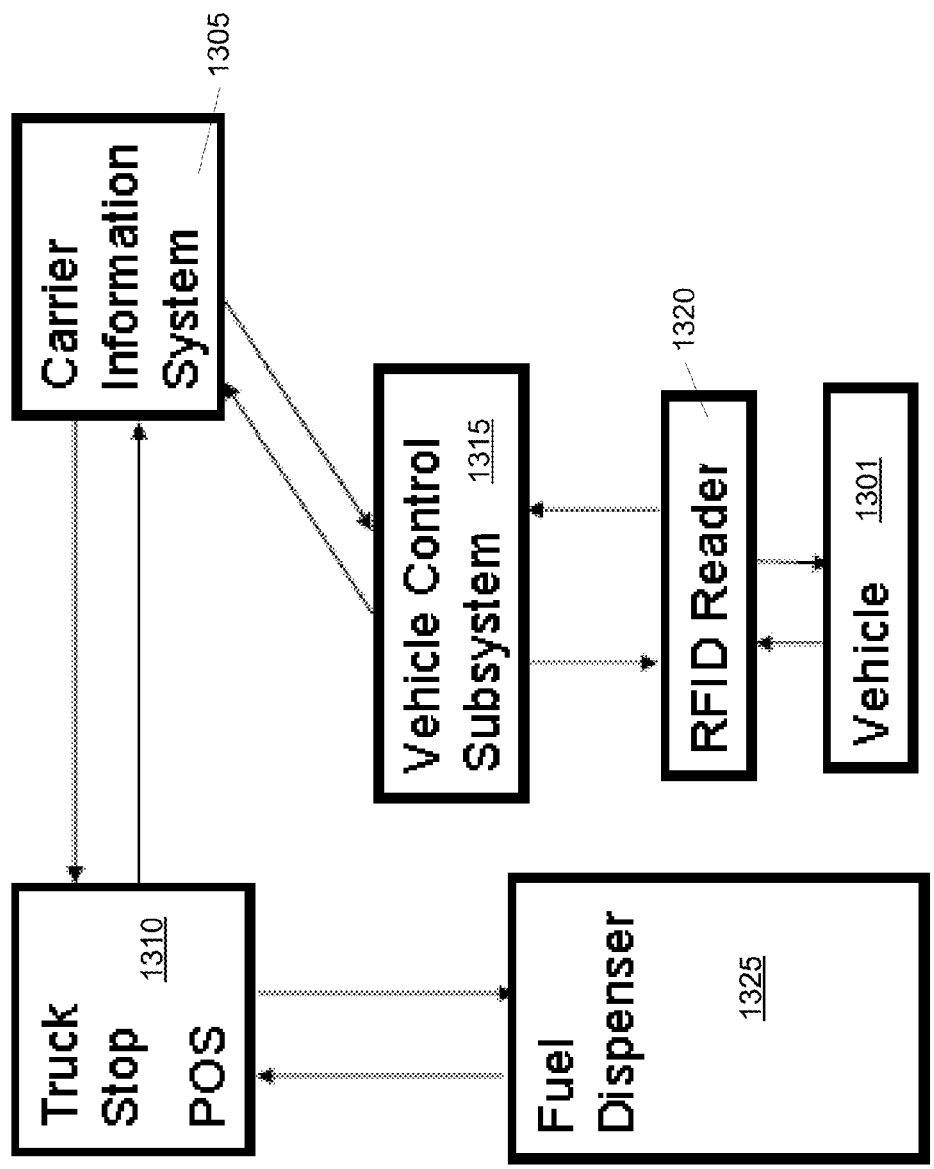
FIG. 13 illustrates a system for obtaining pre-authorization of a transaction and communicating the pre-authorization and payment to a service station according to one or more aspects described herein.

FIG. 13 illustrates an alternate transaction processing system in which a vehicle may request transaction pre-approval from a carrier information system. Vehicle 1301, prior to arriving at a service station, may communicate with carrier information system 1305 to request pre-approval for a transaction at the service station. The pre-approval request may include information such as identification information relating to the vehicle driver, the vehicle, an on-board communication system and the like. The carrier information system 1305 may be configured to then generate a pre-authorization code for identifying and initiating the transaction at the service station. Carrier information system 1305 may further be configured to communicate with a truck stop point-of-sale (POS) 1310 and a vehicle control subsystem 1315, both of which may be located at the service station location. For example, carrier information system 1305 may receive notification from vehicle control subsystem 1315 that vehicle 1301 has arrived at the service station. The notification may include verification information for vehicle 1301 determined using RFID reader 1320. RFID reader 1320 may read identification information from an RFID tag stored or attached to vehicle 1301. An RFID tag (not shown) may alternatively be provided to a vehicle driver (e.g., on a keychain). Thus, in some configurations, vehicle 1301 might not communicate with the service station prior to arrival at the station. Instead, the carrier information system 1305 may be responsible for communication with the service station to arrange payment, notify of transaction authorization and approve and activate service systems.

Truck stop POS 1310, on the other hand, may be configured to receive activation and payment information from carrier information system 1305. In one arrangement, carrier information system 1305 may transmit payment information to truck stop POS 1310 to request activation of a service system such as fuel dispenser 1325. The activation and payment information may include identification of the service system (e.g., which fuel dispenser) for which vehicle 1301 is requesting activation and may be sent prior to or upon arrival of vehicle 1301 at the service station. One or more of truck stop POS 1310 and vehicle control subsystem 1315 may be configured to prompt the vehicle driver for transaction information such as a start code (e.g., to activate a pre-authorization code entry mode) and a pre-authorization code.

Figure 14:
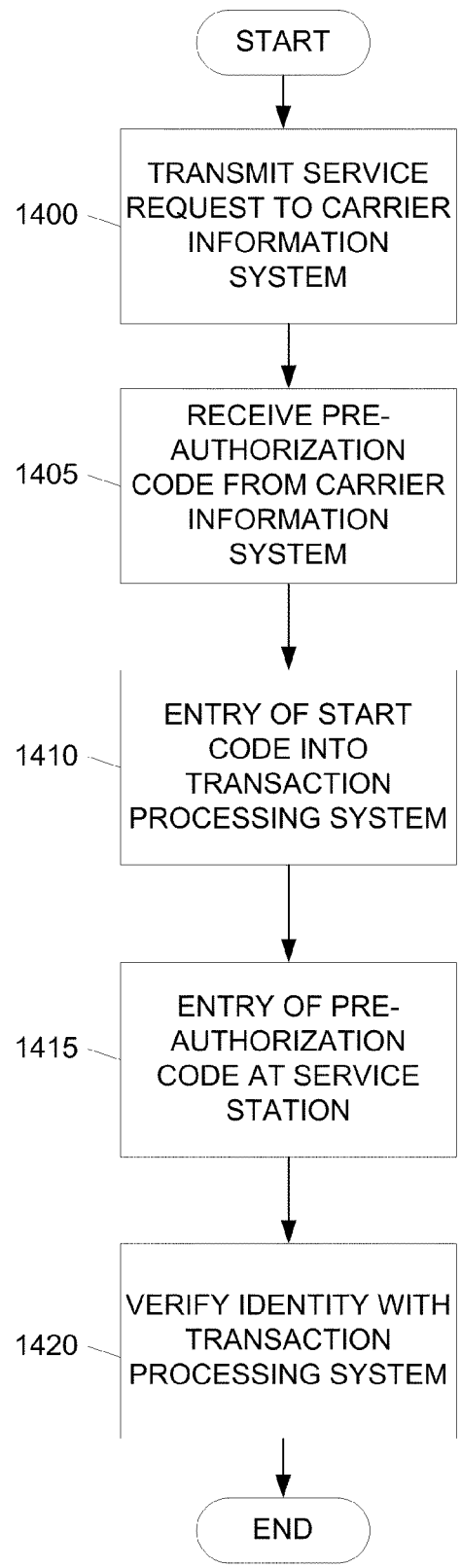
FIG. 14 is a flowchart illustrating a method for obtaining pre-authorization of a transaction and activation a service system according to one or more aspects described herein.

FIG. 14 is a flowchart illustrating a method in which a vehicle may pre-authorize for a transaction prior to arriving at a service station or system. In step 1400, a vehicle may transmit a request for services at a service station to a carrier information system prior to arriving at the service station. The service request may include identification information including a vehicle identifier, a driver identifier, a company or organization identifier and the like. The service request may further include vehicle information such as an amount of fuel, a distance traveled, a current location and/or combinations thereof. In step 1405, the vehicle may receive a pre-authorization code from the carrier information system if the transaction request is approved. In an arrangement, the pre-authorization code may have a limited lifetime. For example, after a specified amount of time, the pre-authorization code may no longer be valid. The lifetime of the pre-authorization code may be set according to a default amount of time (e.g., 1 hour, 2 hours, 30 minutes) or may be generated by the carrier information system based on a variety of factors including a vehicle distance to the service station, location of the vehicle, an actual or estimated speed of the vehicle and the like. For example, the pre-authorization code may be valid for an amount of time equal to or slightly greater than an estimated amount of time needed for the vehicle to reach the service station at its current speed and distance to travel.

Upon arriving at the service station, a driver of the vehicle may enter a start code into a transaction processing system (e.g., subsystem 1315) to enter a pre-authorized transaction interface in step 1410. In step 1415, the driver may enter the pre-authorization code into the transaction processing system. Alternatively or additionally, the vehicle may transmit identification information to the transaction processing system at the service station to verify its identity in step 1420. In one arrangement, the vehicle may include a passive information storage element such as an RFID tag from which an RFID reader may obtain identification information. The pre-authorization code may also be stored in the RFID tag so that a driver might not need to enter the information manually. If the pre-authorization code is accepted by the service station point of sale, a service system may subsequently be activated. If the code is not accepted or one or more pieces of authorization information are not validated, an error message may be transmitted to the vehicle driver.

Figure 15:
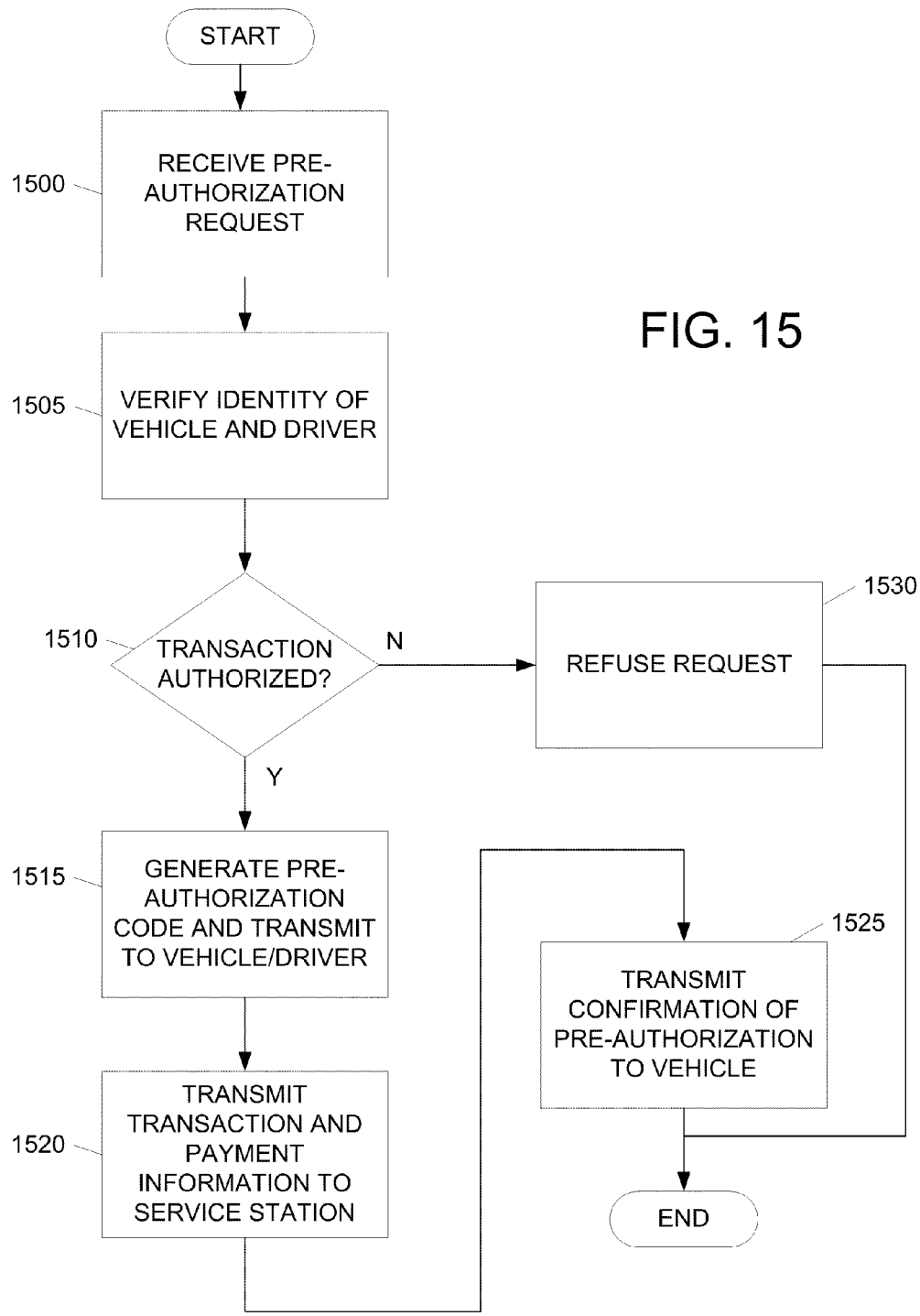
FIG. 15 is a flowchart illustrating an example method for obtaining pre-authorization for a transaction according to one or more aspects described herein.

FIG. 15 illustrates a method by which a carrier information system may pre-authorize transaction requests. In step 1500, the carrier information system may receive a pre-authorization request from a vehicle. The carrier information system may subsequently verify the identity of the vehicle along with a driver of the vehicle in step 1505. The verification may include matching a driver's identifier with the vehicle identifier (e.g., license plate, vehicle identification number (VIN)), verifying a password of the driver and the like. Upon verifying the identity of the vehicle and driver, the carrier information may determine whether the requested transaction is authorized in step 1510. The determination may be made based on a number of allowable service requests, a value or cost of the service request, allowable frequency of service requests and/or combinations thereof. If the transaction is not authorized, the carrier information may refuse the request and issue a message to the vehicle notifying the driver of the denial in step 1530. If, however, the transaction is authorized, the carrier information system may generate a pre-authorization code and transmit the code to the driver in step 1515. In step 1520, the carrier information system may transmit the transaction information including the pre-authorization code and payment information to the service station for which the transaction is requested. In one or more configurations, the transaction information might not be sent to the service station until requested from the service station. In step 1525, a confirmation of the pre-authorized transaction may be transmitted to the vehicle indicating that the service station has received the pre-authorized transaction information.

Figure 16:
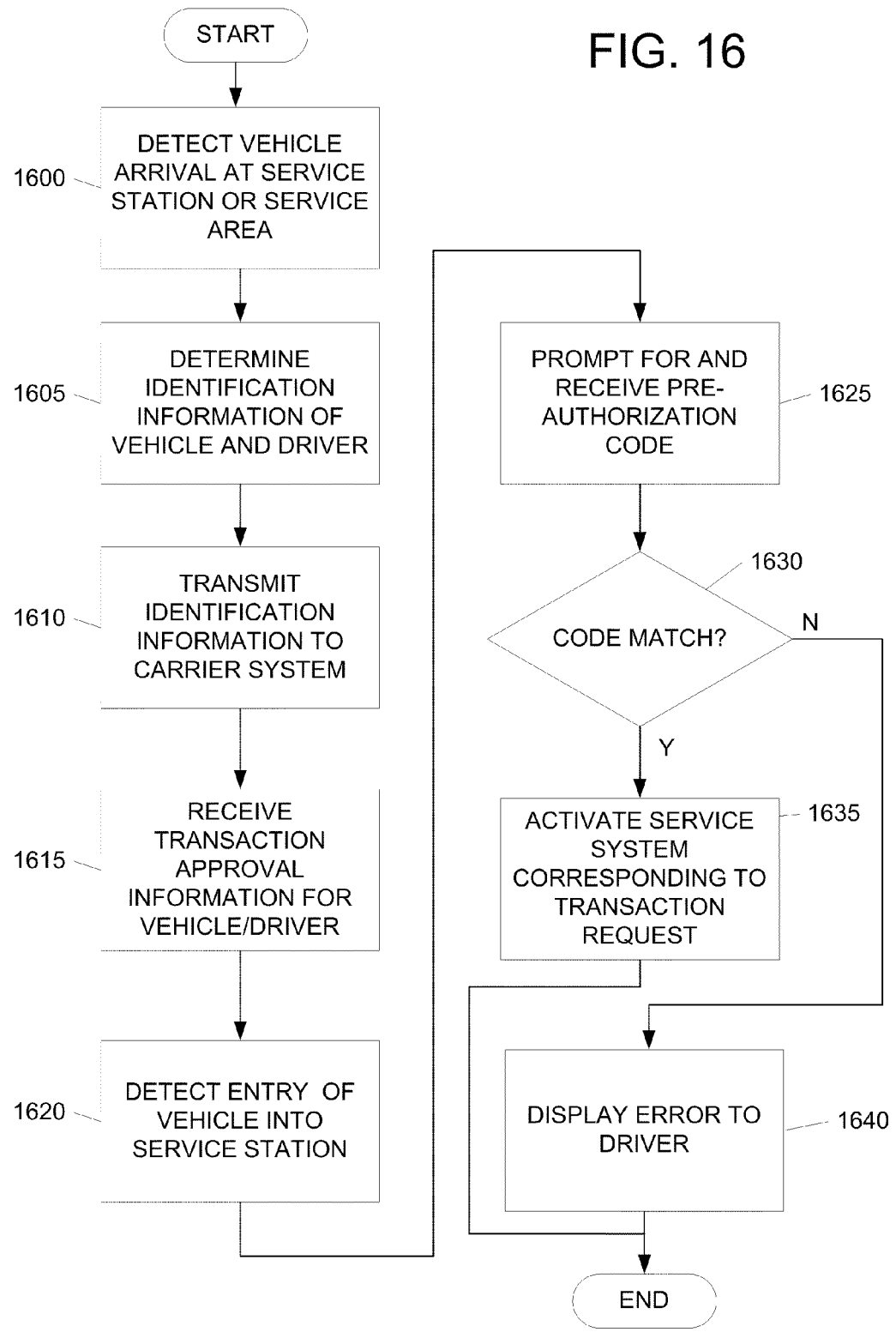
FIG. 16 is a flowchart illustrating an example method for identifying a service requestor and activating a service system according to one or more aspects described herein.

FIG. 16 illustrates a method by which a service station or point of sale system thereof may provide services to a vehicle and driver. In step 1600, the service station may detect a vehicle's arrival in the service station and/or a service area thereof (e.g., a fuel island). The detection may be made using weight sensors, short-range wireless communication techniques, RFID, radar, sonar and other types of presence detection sensors. Additionally, the service station may differentiate between a vehicle's arrival at the service station in general (e.g., a property line defining the service station) and a particular service area such as a fuel pump area. For example, a first set of sensors such as RFID sensors may be used to detect the vehicle's arrival at the station and a second set of sensors (e.g., a weight sensor or another set of RFID sensors) may be used to detect the vehicle's arrival and presence at the particular service area. Alternatively, a single sensor or set of sensors may be configured to detect both entry into and exit from the station and predefined service area of the station.

In step 1605, the service station may read identification information from the vehicle and driver upon detecting the vehicle's arrival. In one example, the identification information may be stored on an RFID tag and read by an RFID reader (e.g., reader 1320) of the service station. In step 1610, the service station may transmit the identification information to a carrier information system associated with the vehicle or driver. For example, the service station may have carrier information stored in a database for known vehicle identifiers. Alternatively or additionally, carrier information may be stored in the RFID tag of the vehicle or driver.

In step 1615, the service station may receive transaction approval information from the carrier information system. Transaction approval information may include a pre-authorization code, types of transactions requested and approved by the carrier as well as values and amount limits. In step 1620, the service station may detect arrival of the vehicle at the service station. Detection of the vehicle's arrival may include detecting an RFID tag associated therewith or receiving communications from a driver of the vehicle (e.g., entering a user ID at a service station). In step 1625, the service station may subsequently prompt for and receive the pre-authorization code issued by the carrier to the vehicle and driver. Upon receiving the pre-authorization code, the service station may determine whether the code received from the driver matches the code in the transaction approval data received from the carrier information system in step 1630. This determination may be performed by transmitting the start code and pre-authorization code to the carrier information system for validation. If so, the service station may activate a service system (e.g., a fuel pump) corresponding to the transaction request in step 1635. In one or more arrangements, the service system might only be activated if the vehicle is within a predefined service area. If, on the other hand, the codes do not match, an error may be displayed to the driver in step 1640. The invalid attempt to receive services at the service station may be transmitted to the carrier information system as well.

In some arrangements, the service station may automatically retrieve identification and authorization information from a device corresponding to the vehicle or driver upon detection of their arrival. For example, the service station may retrieve identification information of the vehicle and driver along with any pre-authorization code information from an RFID tag or wireless communication device of the vehicle. Accordingly, the service station may validate this information with a carrier information system (or independently) to determine whether to activate a corresponding service system.

Figure 17:
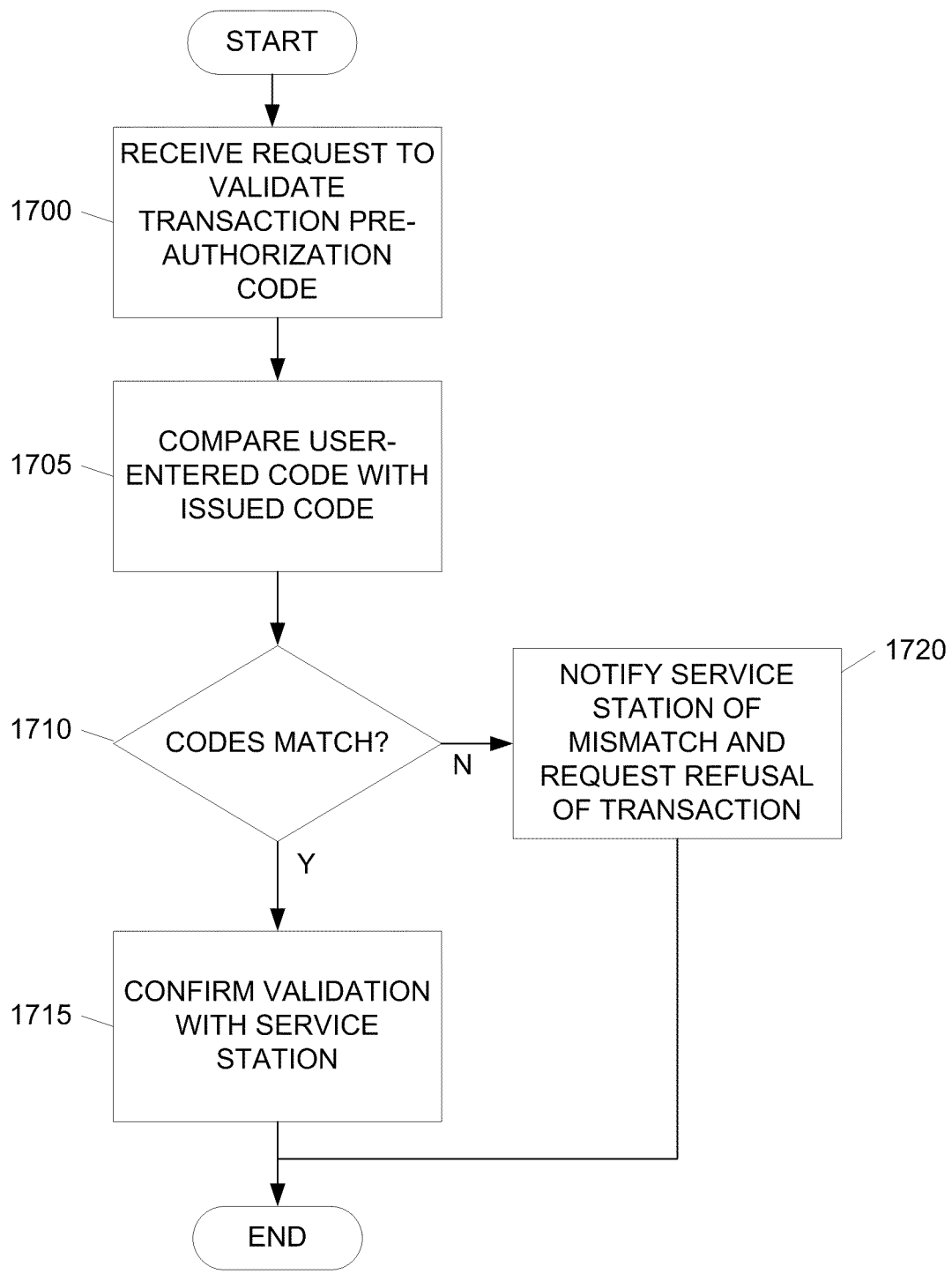
FIG. 17 is a flowchart illustrating an example method for validating a pre-authorized transaction according to one or more aspects described herein.

Furthermore, in one or more configurations, the carrier information system may be configured to determine whether an authorization code entered by a driver at the service station matches the authorization code issued by the carrier information system. Referring to FIG. 17, for example, in step 1700, a carrier information system may receive a request to validate a transaction pre-authorization code entered by a user at the service station. In step 1705, the carrier information system may compare the user-entered pre-authorization code to the issued pre-authorization code. If the codes match, as determined in steps 1705 and 1710, the carrier information system may confirm validation with the service station in step 1715. Otherwise, the carrier information system may notify the service station that the codes do not match and to refuse the transaction in step 1720. Alternatively or additionally, the carrier information system may further verify identification information associated with either the driver or the vehicle or both as an added safety and security measure in step 1720. For example, the system may extract identification information from the validation request and compare the information to the data on-file for a particular issued pre-authorization code or transaction. The identification information may be read off an RFID tag or other data storage module located with the driver or vehicle. This may help insure that the vehicle has not been stolen or otherwise compromised by an unauthorized individual.

According to an additional or alternative aspect, a service system activation might only be effective so long as the vehicle is in the service area corresponding to the service system. For example, a fuel pump might only be active if the vehicle is within a pumping area in front of the fuel pump. This policy may be enforced through continuous, periodic or aperiodic detection of an RFID of the vehicle by the fuel pump. If the RFID moves out of range, the fuel pump may automatically shut off and end the transaction. The determination may be made by the carrier information system, a point of sale system or by the service system (e.g., fuel dispenser, shower station, etc.).

FIG. 18 illustrates a service station environment in which the entry and exit of vehicles from the station and predefined service areas thereof may be detected. Service station 1801 may provide fueling services in addition to other driver and vehicle services. Service station 1801 may also be configured to detect the entry of a vehicle such as truck 1805a into a sensor area 1813 of service station 1801 using sensor 1807. Sensor 1807 may be a short-range WiFi transceiver for example that is able to communicate with wireless devices within a specified range. Other sensors as described herein may also be used to establish a range within which vehicle entry and exit may be detected.

Additionally, sensors 1815a and 1815b may be used to define service detection areas 1809a and 1809b for fuel stations 1803a and 1803b, respectively. Sensors 1815a and 1815b may be configured to detect the entry and exit of vehicles such as vehicle 1805b to and from areas 1809a and 1809b. As noted herein, if a vehicle exits the predefined service detection area, e.g., area 1809a, fuel station 1803a may automatically shut off. Further, when a vehicle such as vehicle 1805c exits station 1801 or a detection area 1813 of station 1801, the exit may be detected and registered. Data regarding the times of vehicle entry and exit and other transaction related information may be sent to a back office 1811 at station 1801 and/or to a carrier information system of a carrier organization to which the vehicle belong or is otherwise associated.

Moreover, a carrier information system or a back office system may continually monitor a transaction to insure that a driver is not exceeding a predefined service limit. For example, a limit for an amount of fuel may be set for a given transaction, in which case, if the driver is approaching or has exceeded the limit, a notification message may be sent to the driver. Alternatively or additionally, the carrier information system may request that the service station be shut off and/or the transaction ended. The notification message may be displayed on a display of the service system (e.g., fuel dispenser) or on a driver or vehicle device. Other information and feedback data may similarly be transmitted to the driver including a number of transactions made on a trip, marketing information for products and services, a driver's performance data and the like.

While the methods and systems described herein have related, in greater part, to fueling transactions and fuel dispensation systems, one of skill in the art will appreciate that the methods and system may be applied to any of a number of transaction types and service systems. For example, a transaction request for tire air may be processed and authorized in much the same way as fuel. Specifically, the transaction request may be pre-authorized and an air dispenser may be activated upon arrival of the requesting vehicle and driver. Other transaction types that may similarly implement the aforementioned methods and systems include maintenance service requests (e.g., oil change, changing tires, vehicle washing, etc.), parking reservation requests and/or cargo pick-up/drop-off requests. Further, other shipping and transportation industries may also implement the systems and methods described herein. For example, mail and other cargo are commonly transported by airplane and/or boat. As such, pre-authorization and processing may also be used to streamline airplane and boat operations such as refueling and maintenance services.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method for processing vehicle transactions, the method comprising:

prior to a vehicle entering a vehicle service station, receiving, from a communication device in the vehicle by at least one computing device remote from the vehicle service station, a transaction request for a prospective transaction associated with the vehicle and a driver of the vehicle at the vehicle service station, wherein the transaction request comprises a unique vehicle identification associated with the vehicle and originating from an engine control module installed in the vehicle;

determining, by the at least one computing device, whether the transaction request is authorized based on the unique vehicle identification associated with the vehicle;

in response to determining that the transaction request is authorized, generating, by the at least one computing device, a first transaction authorization code configured to activate a service system at the vehicle service station, the first transaction authorization code being specific to the transaction request and authorized by a carrier information system;

transmitting, by the at least one computing device, the first transaction authorization code to the vehicle;

detecting that the vehicle has entered a predefined service area within the vehicle service station by a sensor associated with the vehicle service station;

in response to detecting that the vehicle has entered the predefined service area, determining, by the at least one computing device, a location of the vehicle using location information determined from a Radio-frequency identification chip of the vehicle and received by a scanner associated with the vehicle service station from the communication device of the vehicle, wherein the location information is electronically signed by the communication device of the vehicle and further includes a second transaction authorization code;

transmitting a prompt to the vehicle service station for a—the second transaction authorization code;

receiving, by the at least one computing device, the second transaction authorization code in response to the prompt, wherein the second transaction authorization code is collected at the vehicle service station from at least one of the vehicle and the driver;

determining, by the at least one computing device, that the second transaction authorization code matches the first transaction authorization code;

in response to determining that the first and the second transaction authorization codes match, notifying the vehicle service station that the first and the second transaction authorization codes match;

in response to determining that the first and the second transaction authorization codes match, initiating a transaction and activating a fuel pump at the vehicle service station to dispense fuel for a fueling transaction; and upon detecting that the vehicle has left the predefined service station area, automatically shutting off the fuel pump and ending the transaction.

2. The method of claim 1, further comprising transmitting, by the at least one computing device, the first transaction authorization code to the vehicle service station.

3. The method of claim 1, further comprising:
receiving, by the at least one computing device, a request for transaction approval information from the vehicle service station, wherein the request includes identification information for the at least one of the vehicle and the driver of the vehicle; and
transmitting, by the at least one computing device, the first transaction authorization code and authorized transaction types to the vehicle service station in response to the request.

4. The method of claim 3, further comprising transmitting, by the at least one computing device, a confirmation message to at least one of the vehicle and a device associated with the driver of the vehicle indicating that the vehicle service station has received the first transaction authorization code and the authorized transaction types.

5. The method of claim 3, wherein the authorized transaction types comprise transactions for at least one of a product purchase, cash advance, and a shower reservation.

6. The method of claim 1, wherein a transmission including the transaction request further includes one or more additional transaction requests, wherein the one or more additional transaction requests includes at least one of a product purchase request, cash advance and a shower reservation request.

7. The method of claim 1, wherein the step of determining whether the transaction request is authorized includes determining whether a carrier organization associated with the vehicle has sufficient funds to complete the requested transaction prior to the vehicle entering the vehicle service station.

8. The method of claim 1, wherein receiving the second transaction authorization code includes receiving identification information of the at least one of the vehicle and the driver of the vehicle, wherein the identification information of the vehicle is received from the engine control module and the identification information of the driver is received from a communication device of the driver.

9. The method of claim 1, further comprising:
monitoring the transaction after the vehicle arrives at the vehicle service station;
determining whether the transaction has exceeded a pre-approved monetary limit; and
in response to determining that the transaction has exceeded the pre-approved monetary limit, notifying the driver of the vehicle.

10. The method of claim 9, further comprising: based on the determination, requesting deactivation of the fuel pump at the vehicle service station being used for the fueling transaction.

11. The method of claim 9, further comprising:
determining that the vehicle has moved out of the predefined service area; and
in response to determining that the vehicle has moved out of the predefined service area, ending the transaction.

12. The method of claim 1, further comprising:
detecting, by at least one service station device, that the vehicle has entered the vehicle service station using a first set of sensors; and
in response to detecting that the vehicle has entered the service station, automatically retrieving, by the at least one service station device, at least one of vehicle identification and driver identification of the vehicle and the second transaction authorization code via a wireless connection with the vehicle and validating the at least one of the vehicle identification and the driver identification and the second transaction authorization code.

13. The method of claim 12, further comprising detecting, by the at least one service station device, that the vehicle has entered a predefined service area within the vehicle service station using a second set of sensors different from the first set of sensors, wherein the predefined service area is smaller than an area of the vehicle service station.

14. The method of claim 13, wherein the predefined service area comprises a fuel lane corresponding to a fuel pump.

15. The method of claim 1, wherein the first transaction authorization code is valid for an amount of time based on an estimated amount of time needed for the vehicle to enter the vehicle service station and is invalid after the amount of time has passed.

16. The method of claim 1, wherein the unique vehicle identification received by the at least one computing device is digitally signed by the engine control module for authenticity, and wherein determining whether the transaction is authorized comprises:
determining whether the received digitally signed unique vehicle identification is authentic.

17. The method of claim 1, further comprising:
monitoring, by the at least one computing device, the fueling transaction after activating the fuel pump;
determining, by the at least one computing device, whether the fueling transaction has met or exceeded a pre-approved monetary limit; and
in response to determining that the transaction has met or exceeded the pre-approved monetary limit, deactivating, by the at least one computing device, the fuel pump and causing, by the at least one computing device, display of a notification message on a display of the fuel pump.

18. A method, comprising:
receiving, by at least one computing device of a carrier organization remote from a vehicle service station, a transaction request from a vehicle associated with the carrier organization for a prospective transaction associated with the vehicle and a driver of the vehicle at a vehicle service station prior to the vehicle entering the vehicle service station, wherein the transaction request comprises identification information of at least one of the vehicle and the driver;

determining, by the at least one computing device, whether the transaction request is authorized, wherein the determining comprises:
   determining whether the identification information is valid by using the identification information to verify identities of the vehicle and the driver with the carrier organization based on stored identification data associated with the carrier organization; and
   in response to determining that the identification information is valid, determining whether to authorize the prospective transaction;

in response to determining to authorize the prospective transaction, authorizing the prospective transaction and generating, by the at least one computing device, a first transaction authorization code configured to activate a service system at the vehicle service station specific to the transaction request and authorized by a carrier information system;

transmitting, by the at least one computing device, the first transaction authorization code to the vehicle;

detecting that the vehicle has entered a predefined service area within the vehicle service station by a sensor associated with the vehicle service station;

in response to detecting that the vehicle has entered the predefined service area, determining, by the at least one computing device, a location of the vehicle using location information determined from a radio-frequency identification chip of the vehicle and received by a scanner associated with the vehicle service station from a communication device of the vehicle, wherein the location information is electronically signed by the communication device of the vehicle and further includes a second transaction authorization code;

transmitting a prompt to the vehicle service station for a—the second transaction authorization code;

receiving the second transaction authorization code in response to the prompt, wherein the second transaction authorization code is collected at the vehicle service station from at least one of the vehicle and the driver;

determining that the second transaction authorization code matches the first transaction authorization code;

in response to determining that the first and the second transaction authorization codes match, notifying the vehicle service station that the first and the second transaction authorization codes match;

in response to determining that the first and the second transaction authorization codes match, initiating a transaction and activating a fuel pump at the vehicle service station to dispense fuel for a fueling transaction; and upon detecting that the vehicle has left the predefined service station area, automatically shutting off the fuel pump and ending the transaction.

19. The method of claim 18, further comprising:
receiving a request for transaction approval information from the vehicle service station, wherein the request includes identification information for the at least one of the vehicle and the driver of the vehicle; and
transmitting the first transaction authorization code to the vehicle service station in response to the request.

20. The method of claim 18, wherein receiving the second transaction authorization code includes receiving identification information of the at least one of the vehicle and the driver of the vehicle.

21. The method of claim 18, further comprising:
monitoring the transaction after the vehicle arrives at the vehicle service station;
determining whether the transaction has met or exceeded a pre-approved monetary limit; and
in response to determining that the transaction has met or exceeded the pre-approved monetary limit, notifying the driver of the vehicle and deactivating the fuel pump used for the fueling transaction.

22. The method of claim 18, wherein the transaction request comprises identification information of the vehicle and the driver, and wherein determining whether the identification information is valid comprises:
verifying the identities of the vehicle and the driver by determining whether the identification information of the driver corresponds to the identification information of the vehicle based on stored identification information.

23. The method of claim 18, wherein the transaction request includes a request for at least one of goods and services, and wherein the method further comprises:
associating, by the at least one computing device, the first transaction authorization code with the requested at least one of goods and services, wherein the first transaction authorization code is further configured to activate the service system at the vehicle service station for purchase of the associated at least one of goods and services.

24. The method of claim 18, wherein determining whether to authorize the prospective transaction comprises:
determining whether to authorize the prospective transaction based on at least one of a number of allowable service requests, a cost of a service request, and an allowable frequency of service requests.

25. A method for processing vehicle transactions, the method comprising:
prior to a vehicle associated with a carrier organization entering a vehicle service station, receiving, from a communication device in the vehicle by at least one computing device of the carrier organization remote from the vehicle service station, a transaction request for a prospective transaction associated with the vehicle and a driver of the vehicle at the vehicle service station, wherein the transaction request comprises a unique vehicle identification associated with the vehicle and originating from an engine control module installed in the vehicle;
prior to the vehicle entering the vehicle service station, determining, by the at least one computing device, whether the transaction request is authorized based on the unique vehicle identification associated with vehicle including determining whether the carrier organization has sufficient funds to complete the transaction request;
prior to the vehicle entering the vehicle service station, transmitting, by the at least one computing device to the vehicle, a first transaction authorization code configured to activate a service system at the vehicle service station specific to the transaction request and authorized by a carrier information system;
detecting that the vehicle has entered a predefined service area within the vehicle service station by a sensor associated with the vehicle service station;
in response to detecting that the vehicle has entered the predefined service area, determining, by the at least one computing device, a location of the vehicle using location information determined from a radio-frequency identification chip of the vehicle and received by a scanner associated with the vehicle service station from the communication device of the vehicle, wherein the location information is electronically signed by the communication device of the vehicle and further includes a second transaction authorization code;

transmitting a prompt to the vehicle service station for the second transaction authorization code;

after the vehicle enters the vehicle service station, receiving, by the at least one computing device, the second transaction authorization code provided at the vehicle service station from at least one of the vehicle and the driver in response to the prompt;

after the vehicle enters the vehicle service station, determining, by the at least one computing device, that the second transaction authorization code matches the first transaction authorization code;

after the vehicle enters the vehicle service station, in response to determining that the first and the second transaction authorization codes match, notifying the vehicle service station that the first and second transaction authorization codes match;

after the vehicle enters the vehicle service station, in response to determining that the first and the second transaction authorization codes match, initiating a transaction and activating a fuel pump at the vehicle service station to enable the fuel pump to dispense fuel for a fueling transaction and starting the fueling transaction; and upon detecting that the vehicle has left the predefined service station area, automatically shutting off the fuel pump and ending the transaction.

26. The method of claim 25, further comprising:
monitoring the transaction after the vehicle enters the vehicle service station;
determining whether the transaction has exceeded a pre-approved monetary limit; and
in response to determining that the transaction has exceeded the pre-approved monetary limit, notifying the driver of the vehicle or ending the fueling transaction.

27. The method of claim 25, further comprising:
in response to detecting that the vehicle has entered the predefined service area, automatically retrieving at least one of vehicle identification and driver identification of the vehicle and a second transaction authorization code via a wireless connection and validating the at least one of vehicle identification and driver identification and the second transaction authorization code.

28. The method of claim 27, wherein the at least one of vehicle identification and driver identification and a second transaction authorization code are digitally signed by a radio frequency identification (RFID) chip.

29. The method of claim 25, further comprising:
detecting that the vehicle has left a predefined service area of the vehicle service station comprising a fuel lane corresponding to a fuel pump; and
in response to detecting that the vehicle has left the predefined service area, ending the transaction.

30. The method of claim 25, wherein the first transaction authorization code is valid for an amount of time based on an estimated amount of time needed for the vehicle to enter the vehicle service station and is invalid after the amount of time has passed.

31. A method for processing vehicle transactions, the method comprising:

detecting, by a first computing system at a service station, that a vehicle has entered the service station;

in response to detecting that the vehicle has entered the service station, automatically retrieving, by the first computing system, at least one of a unique vehicle identification and a driver identification from the vehicle and a first transaction authorization code via a wireless connection between the vehicle and the service station, wherein the first transaction authorization code is configured to activate a service system at the service station and is specific to a pre-approved transaction and authorized by a carrier information system, wherein the pre-approved transaction is requested prior to the vehicle entering the service station and pre-approved based on the unique vehicle identification originating from an engine control module installed in the vehicle;

detecting that the vehicle has entered a predefined service area within the vehicle service station by a sensor associated with the vehicle service station;

in response to detecting that the vehicle has entered the predefined service area, determining, by the at least one computing device, a location of the vehicle using location information determined from a radio-frequency identification chip of the vehicle and received by a scanner associated with the vehicle service station from a communication device of the vehicle, wherein the location information is electronically signed by the communication device of the vehicle and further includes a second transaction authorization code;

transmitting, by the first computing system to a second computing system associated with a carrier organization of the vehicle, a request for transaction approval comprising the at least one of vehicle identification and driver identification, the request including a prompt for a-the second transaction authorization code;

responsive to the request, receiving the second transaction authorization code from at least one of the vehicle and the driver, the second transaction authorization code being generated in response to a transaction request before detecting that the vehicle has entered the service station;

determining, by the first computing system, whether the first transaction authorization code matches the second transaction authorization code; and in response to determining that the first transaction authorization code matches the second transaction authorization code, activating a fuel pump at the service station to dispense fuel for a fueling transaction; and upon detecting that the vehicle has left the predefined service station area, automatically shutting off the fuel pump and ending the transaction.

32. The method of claim 31, wherein the vehicle identification and the driver identification are automatically retrieved via the wireless connection,
wherein the method further comprises:
determining, by the first computing system, whether the retrieved vehicle identification and the retrieved driver identification are associated with the second transaction authorization code; and
wherein in response to determining that the first transaction authorization code matches the second transaction authorization code, activating a fuel pump at the service station to enable the fuel pump to dispense fuel for a fueling transaction comprises:
in response to determining that the first transaction authorization code matches the second transaction authorization code and determining that the retrieved vehicle identification and the retrieved driver identification are associated with the second transaction authorization code, activating the fuel pump at the service station to enable the fuel pump to dispense fuel for a fueling transaction at the service station.

33. The method of claim 31, wherein the second transaction authorization code is generated in response to a transaction request before detecting that the vehicle has entered the service station, transaction types approved by the carrier organization associated with the vehicle, and pre-approved amount limits associated with the second transaction authorization code.

34. The method of claim 31, wherein determining whether the vehicle is within the predefined service area comprises:
 detecting for the vehicle via a short-range wireless connection; and
 determining whether the vehicle is present in a fuel lane corresponding to a fuel pump using weight sensors located at the fuel lane.

35. The method of claim 31, further comprising:
 monitoring the presence of the vehicle in the predefined service area; and
 in response to determining that the vehicle has left the predefined service area, automatically ending the transaction.

* * * * *